US012404655B2

(12) United States Patent
Muraoka et al.

(10) Patent No.: US 12,404,655 B2
(45) Date of Patent: Sep. 2, 2025

(54) HYDRAULIC-PUMP FLOW-RATE CALIBRATION SYSTEM

(71) Applicant: KAWASAKI JUKOGYO KABUSHIKI KAISHA, Kobe (JP)

(72) Inventors: Hideyasu Muraoka, Kobe (JP); Nobuyuki Kinoshita, Kobe (JP); Tomomichi Nose, Kobe (JP); Yoshihiko Hata, Kobe (JP); Takashi Okashiro, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 911 days.

(21) Appl. No.: 17/428,017

(22) PCT Filed: Jan. 31, 2020

(86) PCT No.: PCT/JP2020/003827
§ 371 (c)(1),
(2) Date: Aug. 3, 2021

(87) PCT Pub. No.: WO2020/162377
PCT Pub. Date: Aug. 13, 2020

(65) Prior Publication Data

US 2022/0106770 A1 Apr. 7, 2022

(30) Foreign Application Priority Data

Feb. 8, 2019 (JP) ................................ 2019-021573

(51) Int. Cl.
*E02F 9/22* (2006.01)
*F04B 1/26* (2006.01)
(Continued)

(52) U.S. Cl.
CPC .................. *E02F 9/22* (2013.01); *F04B 1/26* (2013.01); *F04B 49/065* (2013.01); *F15B 11/02* (2013.01); *F04B 2205/09* (2013.01)

(58) Field of Classification Search
CPC .. E02F 9/22; F04B 1/26; F04B 49/065; F04B 2205/09; F15B 11/02
See application file for complete search history.

(56) References Cited

U.S. PATENT DOCUMENTS

2009/0077837 A1 3/2009 Tozawa et al.
2012/0101744 A1* 4/2012 Matsuura .............. G01F 15/068 702/50
2021/0324609 A1* 10/2021 Takahashi ............. E02F 9/2285

FOREIGN PATENT DOCUMENTS

EP 3379090 A1 9/2018
JP H11311203 A 11/1999
(Continued)

*Primary Examiner* — Adnan M Mirza
(74) *Attorney, Agent, or Firm* — Alleman Hall & Tuttle LLP

(57) ABSTRACT

A hydraulic-pump flow-rate calibration system includes: a variable capacitance type hydraulic pump that supplies an operating fluid to a hydraulic actuator; a regulator that changes the dispense flow rate of the hydraulic pump according to a flow rate command signal; a flow rate detection device that detects the flow rate of the operating fluid; a control device that outputs the flow rate command signal to the regulator to control the regulator; and a calibration device that calculates an actual measurement characteristic of the dispense flow rate for the flow rate command signal, and performs, on a preset reference characteristic, calibration based on the actual measurement characteristic. The actual measurement characteristic is calculated as a result of the flow rate of the operating fluid being detected
(Continued)

by the flow rate detection device during output of a predetermined flow rate command signal from the control device to the regulator.

16 Claims, 12 Drawing Sheets

(51) Int. Cl.
*F04B 49/06* (2006.01)
*F15B 11/02* (2006.01)

(56) References Cited

FOREIGN PATENT DOCUMENTS

| | | | |
|---|---|---|---|
| WO | 2006129422 | A1 | 12/2006 |
| WO | 2017085996 | A1 | 5/2017 |

* cited by examiner

HYDRAULIC-PUMP FLOW-RATE CALIBRATION SYSTEM

TECHNICAL FIELD

The present invention relates to a hydraulic-pump flow-rate calibration system which, in the state where a hydraulic pump is connected to a hydraulic actuator, calibrates the dispense flow rate of the hydraulic pump.

BACKGROUND ART

Construction equipment such as an excavator is capable of performing various tasks such as digging by attachments such as a bucket provided on the construction equipment, and includes an actuator and a supply system in order to perform these tasks. Examples of the actuator include a hydraulic cylinder and a hydraulic motor. By being supplied with an operating fluid, for example, pressure oil, each of the hydraulic cylinder and the hydraulic motor operates in a direction corresponding to the flow direction of the pressure oil supplied thereto, at a speed corresponding to the flow rate of the pressure oil supplied thereto. Furthermore, a supply system is connected to the actuator, and the supply system includes a pump and a directional control valve. In the supply system, the pressure oil is dispensed from the pump in order to operate the actuator, and the directional control valve controls the flow direction and the flow rate of the pressure oil to be supplied from the pump to the actuator. This makes it possible to operate the actuator in a desired direction at a desired speed.

In the supply system having such functions, a pump of the variable capacitance type is used, and the dispense flow rate of the pump is changed according to circumstances to improve the energy efficiency of the supply system. In order to meet such demands, for example, a swash plate pump is used as the pump of the variable capacitance type, and a regulator is configured as follows to rotate the swash plate of the swash plate pump at an angle. Specifically, the regulator rotates the swash plate at an angle corresponding to a signal pressure output from an electromagnetic proportional control valve, and the electromagnetic proportional control valve outputs the signal pressure corresponding to a signal (that is, an electric current) input thereto. In other words, the regulator can cause the pump to dispense the operating fluid at a flow rate corresponding to the signal input to the electromagnetic proportional control valve (that is, a flow rate corresponding to flow rate characteristics); in the supply system, the dispense flow rate of the pump can be electrically controlled.

The supply system configured as described above varies from one product to another in terms of the flow rate characteristics of the regulator. Therefore, the flow rate characteristics are measured in pre-shipment inspection at manufacturing plants, etc., to inspect whether or not the flow rate characteristics are within a range of tolerance, and when the flow rate characteristics are not within the range of tolerance, a component of the regulator is replaced, for example, so that the flow rate characteristics fall in the range of tolerance. In this manner, accurate control of the dispense flow rate of the pump is enabled to further improve the energy efficiency of the supply system.

SUMMARY OF INVENTION

Technical Problem

As mentioned above, at manufacturing plants, etc., the flow rate characteristics are measured in the pre-shipment inspection before shipment of the pump of the variable capacitance type, but in the inspection, the measurement is carried out under only one predetermined pressure condition. On the other hand, it is often the case that a pressure condition under which actual construction equipment or the like with the pump of the variable capacitance type mounted thereon is used does not necessarily match the pressure condition used in the pre-shipment inspection, meaning that the flow rate characteristics measured in the pre-shipment inspection are not reproduced with the actual equipment. In other words, there is an error between the flow rate characteristics measured in the pre-shipment inspection and the flow rate characteristics exhibited by actual equipment. Therefore, in order to eliminate such an error that occurs on actual equipment, it is desired that the dispense flow rate of the hydraulic pump be calibrated in the state where the hydraulic pump is mounted on actual equipment, to enable more precise control of the dispense flow rate.

Thus, an object of the present invention is to provide a hydraulic-pump flow-rate calibration system capable of calibrating the dispense flow rate of a hydraulic pump in the state where the hydraulic pump is mounted on actual equipment.

Solution to Problem

A hydraulic-pump flow-rate calibration system according to the present invention includes: a hydraulic pump of a variable capacitance type that is connected to a hydraulic actuator and supplies an operating fluid to the hydraulic actuator, the hydraulic actuator operating at a speed corresponding to a flow rate of the operating fluid supplied to the hydraulic actuator; a regulator that changes a dispense flow rate of the hydraulic pump according to a flow rate command signal input to the regulator; a flow rate detection device that detects a flow rate of the operating fluid to be supplied to the hydraulic actuator; a control device that outputs the flow rate command signal to the regulator to control the regulator; and a calibration device that calculates an actual measurement characteristic of the dispense flow rate for the flow rate command signal, and performs, on a preset reference characteristic, calibration based on the actual measurement characteristic. The actual measurement characteristic is calculated as a result of the flow rate of the operating fluid to be supplied to the hydraulic actuator being detected by the flow rate detection device during output of a predetermined flow rate command signal from the control device to the regulator.

According to the present invention, in the state where the hydraulic pump is connected to the hydraulic actuator, for example, in actual construction equipment or the like, the dispense flow rate of the hydraulic pump can be calibrated. This makes it possible to reduce variations in the operation of the hydraulic actuator from one machine to another when the operating fluid is supplied from the hydraulic pump to the hydraulic actuator.

In the above invention, it is preferable that the hydraulic actuator be a hydraulic motor, and the flow rate detection device include a rotation sensor that detects a value corresponding to a rotational speed of an output shaft of the hydraulic motor and detect, on the basis of a result of the detection of the rotation sensor and a displacement of the hydraulic motor, the flow rate of the operating fluid to be supplied to the hydraulic motor.

According to the above configuration, by estimating the detection flow rate using the rotation sensor, it is possible to calibrate the dispense flow rate of the hydraulic pump even when a flow rate sensor that detects a flow rate directly is not provided.

In the above invention, it is preferable that the hydraulic motor cause a turning body rotatably provided on a structure to turn, the rotation sensor detect a speed of turning of the turning body as the value corresponding to the rotational speed of the output shaft of the hydraulic motor, and the flow rate detection device detect, on the basis of the speed of turning detected and the displacement of the hydraulic motor, the flow rate of the operating fluid to be supplied to the hydraulic motor.

According to the above configuration, by detecting the speed of turning of the turning body, it is possible to calibrate the dispense flow rate of the hydraulic pump.

In the above invention, it is preferable that the hydraulic-pump flow-rate calibration system further include a control unit that includes the calibration device and is provided on the turning body, and the rotation sensor be a gyroscope sensor and be embedded in the control unit.

According to the above configuration, the gyroscope sensor embedded in the control unit can calculate the speed of turning of the turning body; thus, there is no need to additionally provide a rotation sensor, and thus an increase in the number of components can be minimized.

A hydraulic-pump flow-rate calibration system according to the present invention includes: a first hydraulic pump of a variable capacitance type that is connected to a hydraulic actuator and supplies an operating fluid to the hydraulic actuator, the hydraulic actuator operating at a speed corresponding to a flow rate of the operating fluid supplied to the hydraulic actuator; a second hydraulic pump that is connected to the hydraulic actuator and supplies the operating fluid to the hydraulic actuator; a first regulator that changes a dispense flow rate of the first hydraulic pump according to a first flow rate command signal input to the first regulator; a switch valve that is connected to the first hydraulic pump, the second hydraulic pump, and the hydraulic actuator and connects one of the first hydraulic pump and the second hydraulic pump to the hydraulic actuator; a flow rate detection device that detects the flow rate of the operating fluid to be supplied to the hydraulic actuator; a control device that outputs the first flow rate command signal to the first regulator to control the first regulator; and a calibration device that calculates a first actual measurement characteristic of the dispense flow rate of the first hydraulic pump for the first flow rate command signal, and performs, on a preset first reference characteristic, calibration based on the first actual measurement characteristic. The first actual measurement characteristic is calculated as a result of the first hydraulic pump and the hydraulic actuator being connected by the switch valve and the flow rate of the operating fluid to be supplied to the hydraulic actuator being detected by the flow rate detection device during output of a predetermined first flow rate command signal from the control device to the first regulator.

According to the present configuration, in the state where two hydraulic pumps are connected to the hydraulic actuator, for example, in actual construction equipment or the like, the dispense flow rate of the first hydraulic pump can be calibrated. This makes it possible to reduce variations in the operation of the hydraulic actuator from one machine to another when the operating fluid is supplied from the first hydraulic pump to the hydraulic actuator.

In the above invention, it is preferable that the hydraulic actuator be a hydraulic motor, and the flow rate detection device include a rotation sensor that detects a value corresponding to a rotational speed of an output shaft of the hydraulic motor and detect, on the basis of a result of the detection of the rotation sensor and a displacement of the hydraulic motor, the flow rate of the operating fluid to be supplied to the hydraulic motor.

According to the above configuration, by estimating the detection flow rate using the rotation sensor, it is possible to calibrate the dispense flow rate of the hydraulic pump even when a flow rate sensor that detects a flow rate directly is not provided.

In the above invention, it is preferable that the hydraulic motor cause a turning body rotatably provided on a structure to turn, the rotation sensor detect a speed of turning of the turning body as the value corresponding to the rotational speed of the output shaft of the hydraulic motor, and the flow rate detection device detect, on the basis of the speed of turning detected and the displacement of the hydraulic motor, the flow rate of the operating fluid to be supplied to the hydraulic motor.

According to the above configuration, by detecting the speed of turning of the turning body, it is possible to calibrate the dispense flow rate of the hydraulic pump.

In the above invention, it is preferable that the hydraulic-pump flow-rate calibration system further include a control unit that includes the calibration device and is provided on the turning body, and the rotation sensor be a gyroscope sensor and be embedded in the control unit.

According to the above configuration, the gyroscope sensor embedded in the control unit can calculate the speed of turning of the turning body; thus, there is no need to additionally provide a rotation sensor, and thus an increase in the number of components can be minimized.

In the above invention, it is preferable that the hydraulic-pump flow-rate calibration system further include a second regulator that changes, according to a second flow rate command signal input to the second regulator, a dispense flow rate of the second hydraulic pump that is of the variable capacitance type, the control device output the second flow rate command signal to the second regulator to control the second regulator, the calibration device calculate a second actual measurement characteristic of the dispense flow rate of the second hydraulic pump for the second flow rate command signal, and perform, on a preset second reference characteristic, calibration based on the second actual measurement characteristic, the second actual measurement characteristic be calculated as a result of the second hydraulic pump and the hydraulic actuator being connected by the switch valve and the flow rate of the operating fluid to be supplied to the hydraulic actuator being detected by the flow rate detection device during output of a predetermined second flow rate command signal to the second regulator.

According to the present configuration, in the state where two hydraulic pumps are connected to the hydraulic actuator, for example, in actual construction equipment or the like, the dispense flow rates of both the first hydraulic pump and the second hydraulic pump can be calibrated. This makes it possible to reduce variations in the operation of the hydraulic actuator from one machine to another when the operating fluid is supplied from each hydraulic pump to the hydraulic actuator.

In the above invention, it is preferable that the hydraulic-pump flow-rate calibration system further include: a replenishing unit connected to each of a supply passage formed between a first hydraulic actuator and the switch valve and a pump passage formed between the first hydraulic pump and the switch valve, the first hydraulic actuator being the hydraulic actuator; an exhaust valve connected to the pump passage and configured to be openable and closable, the exhaust valve being opened to discharge, to a tank, the operating fluid flowing in the pump passage; and an outflow rate detection device that detects a flow rate of the operating fluid flowing through the replenishing unit, and the switch valve be further connected to a second hydraulic actuator different from the first hydraulic actuator, and when the first hydraulic pump is connected to the first hydraulic actuator, the switch valve connect the second hydraulic pump to the second hydraulic actuator, and when the second hydraulic pump is connected to the first hydraulic actuator, the switch valve connect the first hydraulic pump to the second hydraulic actuator, and when the second hydraulic pump is connected to the first hydraulic actuator by the switch valve, the replenishing unit allow a flow directed from the supply passage to the pump passage to replenish the second hydraulic actuator with the operating fluid dispensed from the second hydraulic pump and blocks an opposite flow of the operating fluid, and the first actual measurement characteristic be calculated as a result of the first hydraulic pump and the first hydraulic actuator being connected by the switch valve and a flow rate of the operating fluid to be supplied to the first hydraulic actuator when the exhaust valve is closed being detected by the flow rate detection device during the output of the predetermined first flow rate command signal from the control device to the first regulator, and the second actual measurement characteristic be calculated on the basis of the flow rate detected by the flow rate detection device and an outflow rate detected by the outflow rate detection device, as a result of the second hydraulic pump and the first hydraulic actuator being connected by the switch valve and the flow rate of the operating fluid to be supplied to the first hydraulic actuator when the exhaust valve is open being detected by the flow rate detection device during the output of the predetermined second flow rate command signal to the second regulator.

According to the above configuration, in a system including the replenishing unit, the dispense flow rate of the second hydraulic pump can be calibrated with high accuracy.

In the above invention, it is preferable that the replenishing unit include a throttle, and the outflow rate detection device include a first pressure sensor that detects an outlet pressure of the first hydraulic pump and a second pressure sensor that detects an outlet pressure of the second hydraulic pump, and calculate the outflow rate on the basis of a difference between pressures detected by the first pressure sensor and the second pressure sensor.

According to the above configuration, it is possible to obtain an accurate outflow rate when the operating fluid is supplied from the second hydraulic pump to the first hydraulic actuator, and thus the dispense flow rate of the second hydraulic pump can be calibrated with higher accuracy.

In the above invention, it is preferable that the hydraulic-pump flow-rate calibration system further include: a second regulator that changes, according to a second flow rate command signal input to the second regulator, a dispense flow rate of the second hydraulic pump that is of the variable capacitance type; and a bypass passage connecting a supply passage formed between a first hydraulic actuator and the switch valve and a pump passage formed between the first hydraulic pump and the switch valve, the bypass passage including a bypass check valve that blocks a flow directed from the supply passage to the pump passage, the first hydraulic actuator being the hydraulic actuator, and the switch valve be further connected to a second hydraulic actuator different from the first hydraulic actuator, and when the first hydraulic pump is connected to the first hydraulic actuator, the switch valve connect the second hydraulic pump to the second hydraulic actuator, and when the second hydraulic pump is connected to the first hydraulic actuator, the switch valve connect the first hydraulic pump to the second hydraulic actuator, and the control device output the second flow rate command signal to the second regulator to control the second regulator, the calibration device calculate a second actual measurement characteristic of the dispense flow rate of the second hydraulic pump for the second flow rate command signal, and perform, on a preset second reference characteristic, calibration based on the second actual measurement characteristic, the second actual measurement characteristic be calculated on the basis of a detection flow rate and a correction flow rate detected by the flow rate detection device, as a result of the first flow rate command signal serving as a reference being output to the first regulator, the second hydraulic pump being connected to the first hydraulic actuator by the switch valve, the operating fluid dispensed from the first hydraulic pump being supplied to the first hydraulic actuator via the bypass passage, the operating fluid dispensed from the second hydraulic pump being supplied to the first hydraulic actuator via the switch valve, and the flow rate of the operating fluid to be supplied to the first hydraulic actuator being detected by the flow rate detection device during output of a predetermined second flow rate command signal to the second regulator, and the correction flow rate be detected by the flow rate detection device when the first flow rate command signal serving as the reference is output from the control device to the first regulator and the first hydraulic pump is connected to the first hydraulic actuator by the switch valve.

According to the above configuration, in the state where two hydraulic pumps are connected to the hydraulic actuator, for example, in actual construction equipment or the like, the dispense flow rates of both the first hydraulic pump and the second hydraulic pump can be calibrated. This makes it possible to reduce variations in the operation of the hydraulic actuator from one machine to another when the operating fluid is supplied from each hydraulic pump to the hydraulic actuator.

In the above invention, it is preferable that the switch valve be capable of connecting both the first hydraulic pump and the second hydraulic pump to the hydraulic actuator, the calibration device calculate the second actual measurement characteristic of the dispense flow rate of the second hydraulic pump for the second flow rate command signal, and perform, on a preset second reference characteristic, calibration based on the second actual measurement characteristic, the second actual measurement characteristic be calculated on the basis of a detection flow rate and a correction flow rate detected by the flow rate detection device, as a result of the first flow rate command signal serving as a reference being output to the first regulator, both the first hydraulic pump and the second hydraulic pump being connected to the hydraulic actuator by the switch valve, and the flow rate of the operating fluid to be supplied to the hydraulic actuator being detected by the flow rate detection device during the output of the predetermined second flow rate command signal to the second regulator, and the correction flow rate be a flow rate of the operating fluid flowing through the hydraulic actuator when the first flow rate command signal serving as the reference is output from the control device to the first regulator and the first hydraulic pump is connected to the hydraulic actuator by the switch valve.

According to the above configuration, in the state where two hydraulic pumps are connected to the hydraulic actuator, for example, in actual construction equipment or the like, the dispense flow rates of both the first hydraulic pump and the second hydraulic pump can be calibrated. This makes it possible to reduce variations in the operation of the hydraulic actuator from one machine to another when the operating fluid is supplied from each hydraulic pump to the hydraulic actuator.

In the above invention, it is preferable that the calibration device correct, on the basis of an amount of leakage at the hydraulic actuator, the flow rate detected by the flow rate detection device, and calculate the actual measurement characteristic on the basis of the flow rate corrected.

According to the above configuration, the dispense flow rate of each hydraulic pump can be calibrated with higher accuracy.

In the above invention, it is preferable that the actual measurement characteristic be calculated on the basis of a plurality of flow rates detected by the flow rate detection device when a plurality of flow rate command signals different from each other are output.

According to the above configuration, the dispense flow rate of each hydraulic pump can be calibrated with higher accuracy.

In the above invention, it is preferable that when a predetermined condition is met, the calibration device calculate the actual measurement characteristic.

According to the above configuration, when the condition is met, the hydraulic pump can be automatically calibrated, leading to an improvement in convenience.

Advantageous Effects of Invention

With the present invention, the dispense flow rate of the hydraulic pump can be calibrated in the state where the hydraulic pump is mounted on actual equipment.

The above object, other objects, features, and advantages of the present invention will be made clear by the following detailed explanation of preferred embodiments with reference to the attached drawings.

DESCRIPTION OF EMBODIMENTS

Figure 1:
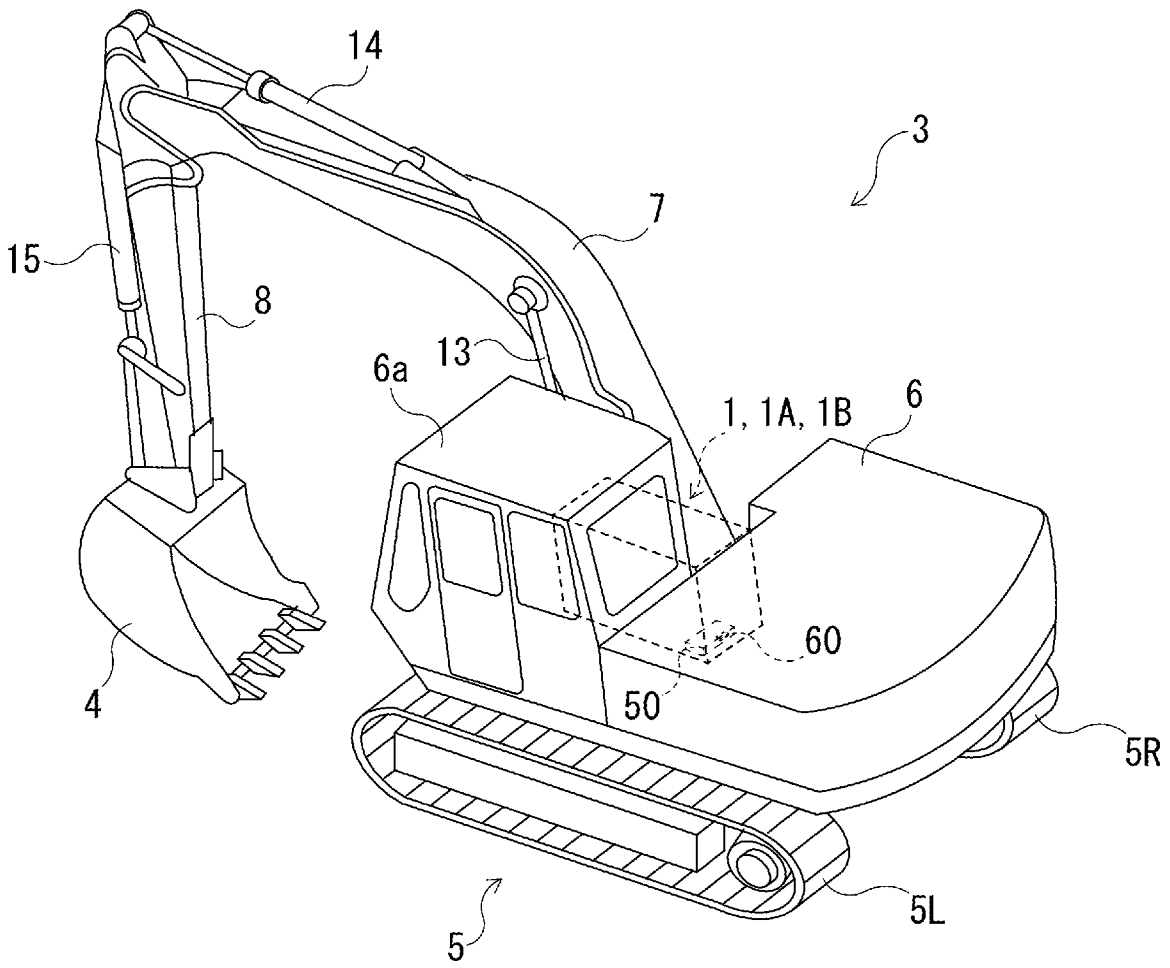
FIG. 1 is a perspective view illustrating an excavator on which a hydraulic drive system according to an embodiment of the present invention is mounted.

Hereinafter, hydraulic drive systems 1, 1A to 1D according to Embodiments 1 to 5, each of which is one example of the hydraulic-pump flow-rate calibration system according to the present invention, will be described with reference to the drawings. Note that the concept of directions mentioned in the following description is used for the sake of explanation; the orientations, etc., of elements according to the present invention are not limited to these directions. Each of the hydraulic drive systems 1, 1A to 1D described below is merely one embodiment of the present invention. Thus, the present invention is not limited to the embodiments and may be subject to addition, deletion, and alteration within the scope of the essence of the present invention.

Embodiment 1

Work equipment such as construction equipment is capable of performing various tasks using an operating fluid (for example, oil). Examples of such work equipment include a crane, a wheel loader, and an excavator, and the following describes an example of application of an excavator 3 illustrated in FIG. 1. The excavator 3 is configured to be able to perform various tasks such as digging by an attachment, for example, a bucket 4, attached to a tip portion of the excavator 3. Furthermore, the excavator 3 includes a traveling device 5 such as a crawler in order to convey a dug material, and a turning body 6 is placed on the traveling device 5.

A driver seat 6*a* for a driver to be seated thereon is formed on the turning body 6, and a boom 7 is provided on the turning body 6 so as to be able to swing vertically. An arm 8 is provided on a tip portion of the boom 7 so as to be able to swing vertically, and the bucket 4 is provided on a tip portion of the arm 8. In other words, the bucket 4 is provided on the turning body 6 via the boom 7 and the arm 8, and it is possible to raise and lower the bucket 4 by operating the boom 7 and the arm 8. Furthermore, the turning body 6 is configured to be able to turn with respect to the traveling device 5, which is the structure, and can cause the bucket 4 to move to any position in the 360-degree circle. The excavator 3 configured as just described includes a plurality of hydraulic actuators 11L, 11R, 12 to 15, for example, in order to move the traveling device 5, the turning body 6, the boom 7, the arm 8, and the bucket 4.

Specifically, the excavator 3 includes a pair of left and right traveling hydraulic motors 11L, 11R, a turning hydraulic motor 12, a boom cylinder 13 (refer to FIG. 1), an arm cylinder 14 (refer to FIG. 1), and a bucket cylinder 15 (refer to FIG. 1). The pair of left and right traveling hydraulic motors 11L, 11R, which are so-called hydraulic motors, are supplied with the operating fluid, thereby drive a pair of left and right crawlers 5L, 5R, of the traveling device 5 to cause the excavator 3 to move forward and backward and change directions. The turning hydraulic motor 12 is provided on the turning body 6 in order to turn the turning body 6. The turning hydraulic motor 12, which is also a so-called hydraulic motor, is supplied with the operating fluid, thereby causing the turning body 6 to turn. The boom cylinder 13, the arm cylinder 14, and the bucket cylinder 15 are provided on the boom 7, the arm 8, and the bucket 4, respectively, and are supplied with the operating fluid and thereby extended and retracted, causing the boom 7, the arm 8, and the bucket 4 to swing, respectively. Thus, various hydraulic actuators 11L, 11R, 12 to 15 are configured to operate when supplied with the operating fluid, and in order to supply the operating fluid thereto, the excavator 3 includes the hydraulic drive system 1.

[Hydraulic Drive System]

Figure 2:
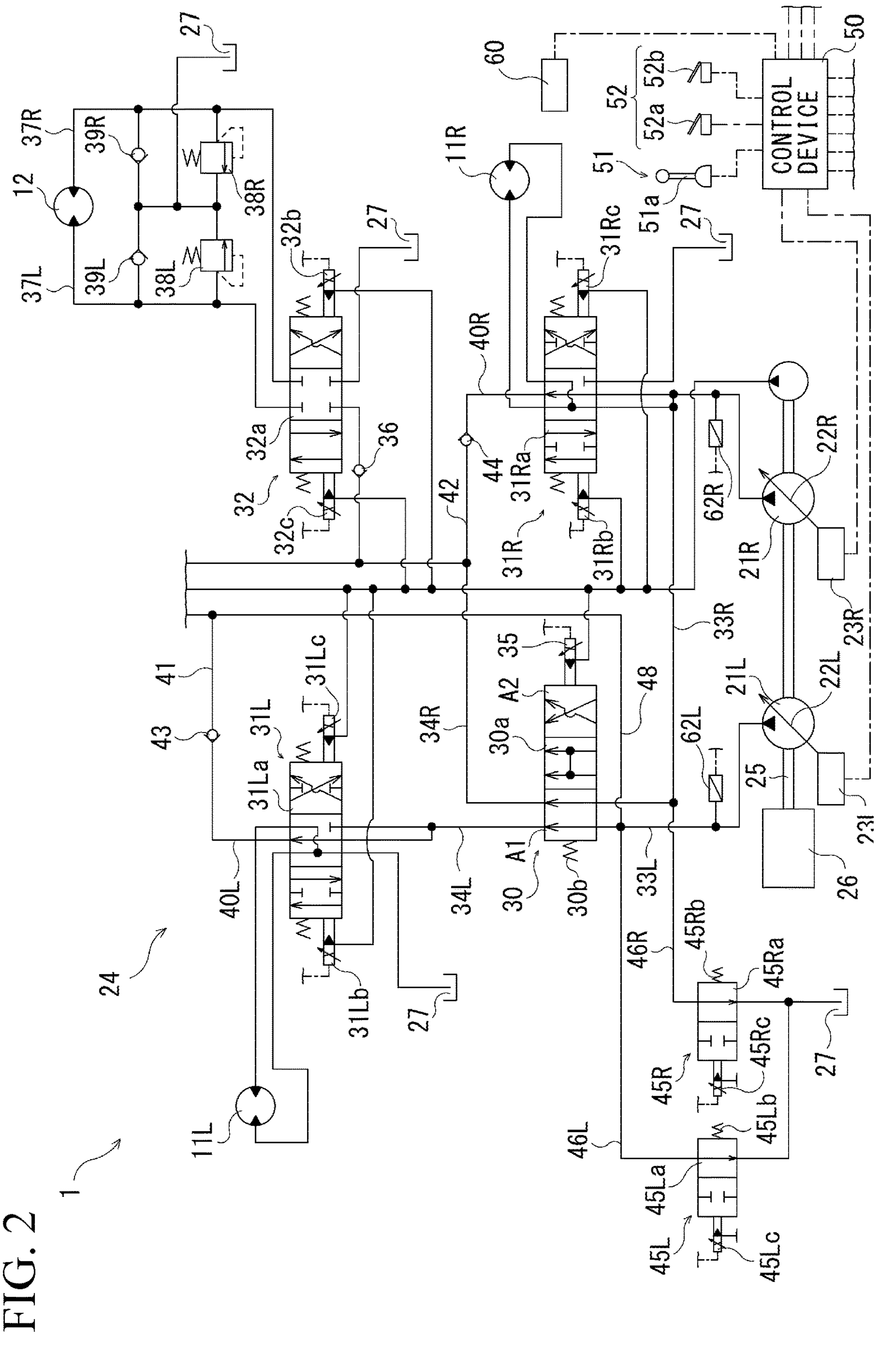
FIG. 2 is a hydraulic circuit representing a hydraulic drive system according to Embodiment 1 which is mounted on the excavator illustrated in FIG. 1.

As illustrated in FIG. 2, the hydraulic drive system 1 mainly includes two hydraulic pumps 21L, 21R, two regulators 23L, 23R, and a hydraulic supply device 24. The two hydraulic pumps 21L, 21R are, for example, tandem double pumps and can be driven by a shared input shaft 25. Note that the two hydraulic pumps 21L, 21R do not necessarily need to be the tandem double pumps and may be parallel double pumps or may each be a separately formed single pump. The number of hydraulic pumps included in the hydraulic drive system 1 is not necessarily limited to two and may be three or more. The two hydraulic pumps 21L, 21R configured as just described are connected to a drive source 26 such as an engine or an electric motor via the input shaft 25, and rotation of the input shaft 25 by the drive source 26 causes the operating fluid to be dispensed from the two hydraulic pumps 21L, 21R.

The two hydraulic pumps 21L, 21R configured as described above are both variable-capacitance swash plate pumps and include swash plates 22L, 22R, respectively. Specifically, one of the two hydraulic pumps 21L, 21R, namely, the left hydraulic pump 21L, can change the dispense flow rate thereof by changing the tilt angle of the swash plate 22L, and the other of the two hydraulic pumps 21L, 21R, namely, the right hydraulic pump 21R, can change the dispense flow rate thereof by changing the tilt angle of the swash plate 22R. Furthermore, the regulators 23L, 23R are provided on the hydraulic pumps 21L, 21R, respectively, in order to change the tilt angles of the swash plates 22L, 22R of the hydraulic pumps 21L, 21R. The two regulators 23L, 23R can control the respective dispense flow rates of the hydraulic pumps 21L, 21R by adjusting the tilt angles according to flow rate command signals input to these regulators.

More specifically, each of the regulators 23L, 23R includes an electromagnetic proportional control valve (not illustrated in the drawings), and the electromagnetic proportional control valve outputs a signal pressure having a value corresponding to the input flow rate command signal. Accordingly, a servo piston (not illustrated in the drawings) of each of the regulators 23L, 23R moves to a position corresponding to the signal pressure. The aforementioned swash plates 22L, 22R are coupled to the servo pistons, and the swash plates 22L, 22R rotate according to movement of the servo pistons. Therefore, each of the swash plates 22L, 22R rotates through a tilt angle corresponding to the flow rate command signal; in other words, the operating fluid is dispensed from each of the hydraulic pumps 21L, 21R at a flow rate corresponding to the flow rate command signal. The operating fluid dispensed in this manner is supplied to the hydraulic actuators 11L, 11R, 12 to 15, and in order to control the direction and the flow rate of the operating fluid that is supplied thereto, the hydraulic supply device 24 is connected to the two hydraulic pumps 21L, 21R.

The hydraulic supply device 24 includes a plurality of directional control valves 31L, 31R, 32. The directional control valves 31L, 31R, 32 are arranged corresponding to the aforementioned hydraulic actuators 11L, 11R, 12 to 15 and can control the flow and the flow rate of the operating fluid that is supplied to the corresponding hydraulic actuators 11L, 11R, 12 to 15. More specifically, the hydraulic supply device 24 includes left and right traveling directional control valves 31L, 31R and a turning directional control valve 32 as the directional control valves corresponding to the hydraulic actuators 11L, 11R, 12. The left and right traveling directional control valves 31L, 31R are arranged corresponding to the pair of left and right traveling hydraulic motors 11L, 11R and control the flow and the flow rate of the operating fluid that is supplied the corresponding traveling hydraulic motors 11L, 11R. On the other hand, the turning directional control valve 32 is arranged corresponding to the turning hydraulic motor 12 and controls the flow and the flow rate of the operating fluid that is supplied to the turning hydraulic motor 12. Note that the hydraulic supply device 24 includes various directional control valves corresponding to the boom cylinder 13, the arm cylinder 14, the bucket cylinder 15, and the like, in addition to the directional control valves 31L, 31R, 32. For example, the directional control valve (not illustrated in the drawings) corresponding to the boom cylinder 13 is connected to a parallel passage 48 branching from a left pump passage 33L. Thus, the hydraulic supply device 24 includes the plurality of directional control valves, but illustration and detailed description of the directional control valves other than the aforementioned three directional control valves 31L, 31R, 32 particularly related to the pump flow-rate calibration process to be described later will be omitted below.

Furthermore, the hydraulic supply device 24 also includes a straight travel valve 30 to be described in detail later in addition to the aforementioned plurality of directional control valves 31L, 31R, 32. Among the three directional control valves 31L, 31R, 32, the two directional control valves 31L, 32 except the right traveling directional control valve 31R are connected to the straight travel valve 30, which is one example of the switch valve. Furthermore, the straight travel valve 30 is connected to the left pump passage 33L and the right pump passage 33R, and is connected to the two hydraulic pumps 21L, 21R via the pump passages 33L, 33R. In other words, the two directional control valves 31L, 32 are connected to the hydraulic pumps 21L, 21R via the straight travel valve 30. Meanwhile, the right traveling directional control valve 31R is connected to the right hydraulic pump 21R so as to be parallel to the straight travel valve 30. In other words, the right traveling directional control valve 31R is connected to the right hydraulic pump 21R without passing through the straight travel valve 30; the right traveling directional control valve 31R is configured as follows.

The right traveling directional control valve 31R is connected to the right pump passage 33R and is also connected to the tank 27 and the right traveling hydraulic motor 11R and can switch the connection thereof. More specifically, the right traveling directional control valve 31R is what is called a spool valve and includes a spool 31Ra. The spool 31Ra receives pilot pressures output from two different electromagnetic proportional control valves 31Rb, 31Rc provided at both ends of the spool 31Ra and moves from a neutral position in either of predetermined opposite directions in accordance with the difference between the two pilot pressures received. Accordingly, the connection between the right traveling hydraulic motor 11R and each of the right pump passage 33R and the tank 27 is switched. Specifically, at the right traveling directional control valve 31R, the right pump passage 33R and the right traveling hydraulic motor 11R are disconnected when the spool 31Ra is in the neutral position. When the spool 31Ra moves from the neutral position in either of the predetermined opposite directions, the right pump passage 33R is connected to the right traveling hydraulic motor 11R, and the operating fluid is supplied to the right traveling hydraulic motor 11R. Furthermore, at the right traveling directional control valve 31R, the flow direction of the operating fluid that is supplied to the right traveling hydraulic motor 11R is switched according to the position of the spool 31Ra, and by switching the flow direction, it is possible to change the direction of rotation of the right traveling hydraulic motor 11R. Moreover, the degree of opening of the right traveling directional control valve 31R is adjusted to be a degree of opening corresponding to the position of the spool 31Ra, and the right traveling directional control valve 31R controls the speed of the right traveling hydraulic motor 11R by causing the operating fluid to flow to the right traveling hydraulic motor 11R at a flow rate corresponding to the degree of opening.

The right traveling directional control valve 31R configured as described above is directly connected to the right hydraulic pump 21R via the right pump passage 33R as mentioned above. Meanwhile, the other directional control valves 31L, 31R are connected to the two hydraulic pumps 21L, 21R via the straight travel valve 30 as mentioned above, and the straight travel valve 30 is capable of switching between the hydraulic pumps 21L, 21R to be connected to the directional control valves 31L, 31R, according to the operating status of the excavator 3. The straight travel valve 30 having such a function is configured as follows.

The straight travel valve 30 is used to reduce the unevenness in the flow rates of the operating fluid flowing to the pair of left and right traveling hydraulic motors 11L, 11R at the time of operating an actuator and the like, for example, performing a boom operation, a turning operation, and the like while causing the excavator 3 to travel straight. In order to fulfill such a function, the straight travel valve 30 is capable of switching between the hydraulic pumps 21L, 21R to be connected to the two directional control valves 31L, 32, respectively. The straight travel valve 30 configured as just described is connected to the right pump passage 33R so as to be parallel to the right traveling directional control valve 31R as mentioned above, and is also connected to the left pump passage 33L. Furthermore, a left supply passage 34L and a right supply passage 34R are connected to the straight travel valve 30; the left traveling directional control valve 31L is connected to the straight travel valve 30 via the left supply passage 34L, and the turning directional control valve 32 is connected to the straight travel valve 30 via the right supply passage 34R. The straight travel valve 30 disposed as just described switches the connection of each of these four passages 33L, 33R, 34L, 34R and switches between the hydraulic pumps 21L, 21R to be connected to the two directional control valves 31L, 32, respectively.

More specifically, the straight travel valve 30 is what is called a spool valve and includes a spool 30*a*. The spool 30*a* can move along the axial line thereof; as a result of movement of the spool 30*a*, the function of the straight travel valve 30 is switched. Specifically, the spool 30*a* can move between a first position A1 and a second position A2. When the spool 30*a* is in the first position A1, the left pump passage 33L is connected to the left supply passage 34L, and the right pump passage 33R is connected to the right supply passage 34R (a first function). In contrast, when the spool 30*a* is in the second position A2, the left pump passage 33L is connected to the right supply passage 34R, and the right pump passage 33R is connected to the left supply passage 34L (a second function). Furthermore, at the straight travel valve 30, in the state where the spool 30*a* is located between the first position A1 and the second position A2, the connection of each of the four passages 33L, 33R, 34L, 34R changes as follows.

Specifically, as the spool 30*a* moves from the first position A1 to the second position A2, the spool 30*a* increases the degree of opening between the left pump passage 33L and the right supply passage 34R. Furthermore, as the spool 30*a* moves from the first position A1 to the second position A2, the degree of opening between the right pump passage 33R and the left supply passage 34L increases. Moreover, at the straight travel valve 30, in the state where the spool 30*a* is located between the first position A1 and the second position A2, both the two pump passages 33L, 33R are connected to the two hydraulic pumps 21L, 21R (a merging function).

In this manner, the straight travel valve 30 is designed to be able to switch the connection of each of the four passages 33L, 33R, 34L, 34R by changing the position of the spool 30*a*. Furthermore, a spring member 30*b* is provided on the spool 30*a* in order to change the position of the spool 30*a*. The spring member 30*b* is provided at one end of the spool 30*a* and biases the spool 30*a* in order to place the spool 30*a* in the first position A1. Furthermore, a switch command pressure acts on the other end of the spool 30*a* to withstand the force of the spring member 30*b*, and a switching electromagnetic proportional control valve 35 is connected to the straight travel valve 30 in order to exert the switch command pressure. The switching electromagnetic proportional control valve 35 outputs a switch command pressure having a value corresponding to a received switch command signal. The output switch command pressure is provided to the other end of the spool 30*a* as mentioned above, and the spool 30*a* is pressed with the pressing force corresponding to the switch command pressure.

As described above, the basing force of the spring member 30*b* and the pressing force corresponding to the switch command pressure act on the ends of the spool 30*a* so as to oppose each other, and the spool 30*a* moves to a position where these forces are in balance. In other words, by adjusting the switch command pressure, it is possible to move the spool 30*a* between the first position A1 and the second position A2 and switch the connection destination of each of the two pump passages 33L, 33R to one of the supply passages 34L, 34R. The left traveling directional control valve 31L is connected to the left supply passage 34L, the connection destination of which is changeable as just described.

The left traveling directional control valve 31L is connected to the left traveling hydraulic motor 11L and the tank 27 in addition to the left supply passage 34L and can switch the connection of each of the left traveling hydraulic motor 11L and the tank 27. More specifically, the left traveling directional control valve 31L is what is called a spool valve and includes a spool 31La. The spool 31La receives pilot pressures output from two different electromagnetic proportional control valves 31Lb, 31Lc provided at both ends of the spool 31La and moves from a neutral position in either of predetermined opposite directions in accordance with the difference between the two pilot pressures received. Accordingly, the connection between the left traveling hydraulic motor 11L and each of the left supply passage 34L and the tank 27 is switched. Specifically, at the left traveling directional control valve 31L, the left supply passage 34L and the left traveling hydraulic motor 11L are disconnected when the spool 31La is in the neutral position. When the spool 31La moves from the neutral position in either of the predetermined opposite directions, the left supply passage 34L is connected to the left traveling hydraulic motor 11L, and the operating fluid guided to the left supply passage 34L can be supplied to the left traveling hydraulic motor 11L. Furthermore, at the left traveling directional control valve 31L, the flow direction of the operating fluid that is supplied to the left traveling hydraulic motor 11L is switched according to the position of the spool 31La, and by switching the flow direction, it is possible to change the direction of rotation of the left traveling hydraulic motor 11L. Moreover, the degree of opening of the left traveling directional control valve 31L is adjusted according to the position of the spool 31La, and the left traveling directional control valve 31L controls the speed of the left traveling hydraulic motor 11L by causing the operating fluid to flow to the left traveling hydraulic motor 11L at a flow rate corresponding to the degree of opening. The left traveling directional control valve 31L configured as just described is connected to the left supply passage 34L as mentioned above. Meanwhile, the turning directional control valve 32 is connected to the right supply passage 34R.

The turning directional control valve 32 is connected to the turning hydraulic motor 12 and the tank 27 in addition to the right supply passage 34R. Note that a check valve 36 is provided between the right supply passage 34R and the turning directional control valve 32, and the flow of the operating fluid from the turning directional control valve 32 toward the right supply passage 34R is blocked by the check valve 36. The turning directional control valve 32 disposed as just described can switch the connection between the turning hydraulic motor 12 and each of the right supply passage 34R and the tank 27. More specifically, the turning directional control valve 32 is what is called a spool valve and includes a spool 32*a*. The spool 32*a* receives pilot pressures output from two different electromagnetic proportional control valves 32*b*, 32*c* provided at both ends of the spool 32*a* and moves from a neutral position in either of predetermined opposite directions in accordance with the difference between the two pilot pressures received. Thus, the connection between the turning hydraulic motor 12 and each of the right supply passage 34R and the tank 27 can be switched. Specifically, at the turning directional control valve 32, the right supply passage 34R and the turning hydraulic motor 12 are disconnected when the spool 32*a* is in the neutral position. When the spool 32*a* moves from the neutral position in either of the predetermined opposite directions, the right supply passage 34 is connected to the turning hydraulic motor 12, and the operating fluid guided to the right supply passage 34 can be supplied to the turning hydraulic motor 12. Furthermore, at the turning directional control valve 32, the flow direction of the operating fluid that is supplied to the turning hydraulic motor 12 is switched according to the position of the spool 32*a*, and by switching the flow direction, it is possible to change the direction of rotation of the turning hydraulic motor 12. Moreover, the degree of opening of the turning directional control valve 32 is adjusted according to the position of the spool 32*a*, and the turning directional control valve 32 controls the speed of the turning hydraulic motor 12 by causing the operating fluid to flow to the turning hydraulic motor 12 at a flow rate corresponding to the degree of opening.

Note that the following elements are connected between the turning directional control valve 32 and the turning hydraulic motor 12. Specifically, the turning directional control valve 32 is connected to the turning hydraulic motor 12 via two turning supply passages 37L, 37R, and relief valves 38L, 38R are connected to the two turning supply passages 37L, 37R, respectively. When the hydraulic pressure of the operating fluid flowing through the turning supply passages 37L, 37R connected to the two relief valves 38L, 38R exceeds a predetermined relief pressure, the two relief valves 38L, 38R discharge the operating fluid to the tank 27. Furthermore, the two turning supply passages 37L, 37R are connected to the tank 27 via check valves 39L, 39R and are designed to be able to add the operating fluid from the tank 27 when there is a shortage of the operating fluid.

Furthermore, the hydraulic supply device 24 includes: a bypass passage 40L branching from the left supply passage 34L; and a bypass passage 40R branching from the right pump passage 33R. In these two bypass passages 40L, 40R, the respective traveling directional control valves 31L, 31R are located. Specifically, the left traveling directional control valve 31L is located in the left bypass passage 40L, which is one of the bypass passages, and the degree of opening of the left bypass passage 40L is adjusted according to the operation of the left traveling directional control valve 31L. Meanwhile, the right traveling directional control valve 31R is located in the right bypass passage 40R, and the degree of opening of the right bypass passage 40R is adjusted according to the operation of the right traveling directional control valve 31R.

Furthermore, in the hydraulic supply device 24, a first replenishing passage 41 and a second replenishing passage 42 are formed in order to replenish each of the parallel passage 48 and the right supply passage 34R with the operating fluid when the flow rate of the operating fluid in these passages is insufficient. The first replenishing passage 41 is formed to provide a bridge between the left bypass passage 40L and the parallel passage 48, and the second replenishing passage 42 is formed to provide a bridge between the right bypass passage 40R and the right supply passage 34R. Furthermore, a check valve 43 is located in the first replenishing passage 41. The check valve 43 guides the operating fluid from the left bypass passage 40L to the parallel passage 48 and blocks the opposite flow of the operating fluid. In other words, the check valve 43 guides the operating fluid from the left bypass passage 40L to the parallel passage 48 when the flow rate of the operating fluid in the parallel passage 48 is insufficient. Meanwhile, a check valve 44 is located in the second replenishing passage 42. The check valve 44, which is one example of the bypass check valve, guides the operating fluid from the right bypass passage 40R to the right supply passage 34R and blocks the opposite flow of the operating fluid. In other words, the check valve 44 guides the operating fluid from the right bypass passage 40R to the right supply passage 34R when the flow rate of the operating fluid in the right supply passage 34R is insufficient. Furthermore, two unloader valves 45L, 45R are connected to the two pump passages 33L, 33R, respectively, and the two pump passages 33L, 33R are connected to the tank 27 via the corresponding unloader valves 45L, 45R.

The two unloader valves 45L, 45R are, for example, spool valves, and include spools 45La, 45Ra. The two unloader valves 45L, 45R can adjust the degrees of openings of tank passages 46L, 46R connecting the corresponding pump passages 33L, 33R and the tank 27 by sliding the spools 45La, 45Ra and thereby control the flow rate of the operating fluid flowing to the supply passages 34L, 34R (that is, bleed-off control). Thus, the unloader valves 45L, 45R are designed to be able to adjust the degrees of openings of the tank passages 46L, 46R by sliding the spools 45La, 45Ra, in other words, changing the positions of the spools 45La, 45Ra; in order to change these positions, the unloader valves 45L, 45R include spring members 45Lb, 45Rb.

The spring members 45 Lb, 45Rb are provided at one end of the spools 45La, 45Ra and bias the spools 45La, 45Ra in order to close the tank passages 46L, 46R. Furthermore, left and right unloading command pressures act on the other end of the spools 45La, 45Ra to withstand the forces of the spring members 45Lb, 45Rb, and electromagnetic proportional control valves 45Lc, 45Rc are connected to the unloader valves 45L, 45R in order to output the left and right unloading command pressures. The electromagnetic proportional control valves 45Lc, 45Rc output the unloading command pressures having values corresponding to received unloading command signals. The output unloading command pressures are provided to the other end of the spools 45La, 45Ra as mentioned above, and the spools 45La, 45Ra are pressed with the pressing forces corresponding to the unloading command pressures.

As described above, the basing forces of the spring members 45Lb, 45Rb and the pressing forces corresponding to the unloading command pressures act on the ends of the spools 45La, 45Ra so as to oppose each other, and the spools 45La, 45R move to positions where these forces are in balance. Therefore, by adjusting the unloading command pressures, it is possible to adjust the degrees of openings of the tank passages 46L, 46R and thus close the tank passages 46L, 46R.

The hydraulic drive system 1 configured as described above further includes a control unit 50, and the operation of the regulators 23L, 23R, the straight travel valve 30, the directional control valves 31L, 31R, 32, and the unloader valves 45L, 45R is controlled by the control unit 50. Furthermore, a turning operation device 51 and a traveling operation device 52 are electrically connected to the control unit 50, which is the control device, and commands related to the operation of the hydraulic supply device 24 can be provided by these operation devices 51, 52. These operation devices 51, 52 are provided on the excavator 3 (more specifically, the driver seat 6*a*) in order to operate the turning hydraulic motor 12 and the pair of traveling hydraulic motors 11L, 11R; for example, the operation devices 51, 52 include electric joysticks or remote control valves.

More specifically, the turning operation device 51 includes a turning operation lever 51*a* and is provided on the driver seat 6*a* of the excavator 3 in order to operate the turning hydraulic motor 12. The turning operation lever 51*a* can be pulled down; when the turning operation lever 51*a* is pulled down, the turning operation device 51 outputs a signal to the control unit 50. Meanwhile, the traveling operation device 52 is provided on the driver seat 6*a* of the excavator 3 in order to operate the pair of left and right traveling hydraulic motors 11L, 11R. The traveling operation device 52 disposed as just described includes one pair of left and right foot pedals 52*a*, 52*b*; the foot pedal 52*a* is provided corresponding to the left traveling hydraulic motor 11L, and the foot pedal 52*b* is provided corresponding to the right traveling hydraulic motor 11R. Each of the foot pedals 52*a*, 52*b* can be operated, for example, by being stepped on with a foot; when the foot pedal 52*a*, 52*b* is operated, the traveling operation device 52 outputs a signal to the control unit 50.

The control unit 50 is designed to control the operation of the directional control valves 31L, 31R, 32 in accordance with the signals output from the operation devices 51, 52; the control unit 50 is configured as follows in order to control the operation of the directional control valves 31L, 31R, 32. Specifically, the control unit 50 is electrically connected to the electromagnetic proportional control valves 31Lb, 31Lc, 31Rb, 31Rc, 32*b*, 32 provided on the directional control valves 31L, 31R, 32 and outputs command signals to the electromagnetic proportional control valves 31Lb, 31Lc, 31Rb, 31Rc, 32*b*, 32*c* in accordance with the signals output from the operation devices 51, 52. Furthermore, the control unit 50 is electrically connected to the switching electromagnetic proportional control valve 35 provided on the straight travel valve 30 as well and outputs a switch command signal to the switching electromagnetic proportional control valve 35, for example, in accordance with the output signal of the traveling operation device 52. Moreover, the control unit 50 is electrically connected to the electromagnetic proportional control valves 45Lc, 45Rc, which are connected to the unloader valves 45L, 45R, as well and outputs the unloading command signals to the electromagnetic proportional control valves 45Lc, 45Rc in accordance with the output signals of the operation devices 51, 52.

Furthermore, the hydraulic drive system 1 includes the following elements. Specifically, the hydraulic drive system 1 includes a gyroscope sensor 60. The gyroscope sensor 60, which is the flow rate detection device, is a three-axis gyroscope sensor, for example, and is electrically connected to the control unit 50. The gyroscope sensor 60 outputs, to the control unit 50, signals corresponding to angular velocities about predetermined x-axis, y-axis, and z-axis, and the control unit 50 calculates the angular velocity about each axis on the basis of the signal from the gyroscope sensor 60. The gyroscope sensor 60 configured as just described is provided in the turning body 6 so as to be housed in a casing 50*a* of the control unit 50 such as that illustrated in FIG. 1; in other words, the gyroscope sensor 60 is embedded in the control unit 50. The gyroscope sensor 60 disposed as just described is designed to turn together with the turning body 6 at the time of turning of the turning body 60, and the control unit 50 is capable of calculating the speed of turning of the turning body 6 on the basis of the signal output from the gyroscope sensor 60.

Furthermore, the hydraulic drive system 1 includes two pressure sensors 62L, 62R. One of the two pressure sensors 62L, 62R, that is, the left pressure sensor 62L, is connected to the left pump passage 33L and outputs a signal corresponding to the dispense pressure of the left hydraulic pump 21L to the control unit 50. The other pressure sensor, that is, the right pressure sensor 62R is connected to the right pump passage 33R and outputs a signal corresponding to the dispense pressure of the right hydraulic pump 21R to the control unit 50. Subsequently, the control unit 50 detects the dispense pressures of the two hydraulic pumps 21L, 21R on the basis of the signals output from the two pressure sensors 62L, 62R. In addition, the control unit 50 performs various calculations and stores a variety of information.

[Operation of Hydraulic Drive System]

In the hydraulic drive system 1 configured as described above, the control unit 50 controls the operation of the hydraulic supply device 24 in accordance with the operation performed on the operation devices 51, 52 and operates the hydraulic actuators 11L, 11R, 12. The operation of the control unit 50 performed to operate the hydraulic actuators 11L, 11R, 12 will be described below. Specifically, when the turning operation lever 51*a* is operated and a signal is output from the turning operation device 51, the control unit 50 first operates the right unloader valve 45R and closes the right tank passage 46R. Furthermore, the control unit 50 outputs a turning command signal corresponding to the signal of the turning operation device 51 to the electromagnetic proportional control valve 32*b* (or the electromagnetic proportional control valve 32*c*) and operates the turning directional control valve 32. At this time, the spool 30*a* of the straight travel valve 30 is in the first position A1, and the turning directional control valve 32 is connected to the right hydraulic pump 21R via the right pump passage 33R and the right supply passage 34R. Therefore, the operating fluid from the right hydraulic pump 21R is supplied to the turning hydraulic motor 12, and the turning hydraulic motor 12 rotates with the operating fluid. Furthermore, at the turning directional control valve 32, the spool 32*a* moves to a position corresponding to the amount of operation on the turning operation lever 51*a*, and the turning directional control valve 32 opens with a degree of opening corresponding to the amount of the operation on the turning operation lever 51*a*. Thus, the operating fluid is supplied to the turning hydraulic motor 12 at a flow rate corresponding to the degree of opening, allowing the turning body 6 to turn at a speed of turning that corresponds to the amount of the operation on the turning operation lever 51*a*.

Next, when only one of the pair of foot pedals 52*a*, 52*b*, for example, the left foot pedal 52*a*, is operated and a signal is output from the traveling operation device 52, the control unit 50 first operates the left unloader valve 45L and closes the left tank passage 46L. Furthermore, the control unit 50 outputs a traveling command signal corresponding to the signal of the traveling operation device 52 to the electromagnetic proportional control valve 31Lb (or the electromagnetic proportional control valve 31Lc) and operates the left traveling directional control valve 31L. When only one of the pair of foot pedals 52*a*, 52*b* is operated, the spool 30*a* of the straight travel valve 30 is in the first position A1, and the left traveling directional control valve 31L is connected to the left hydraulic pump 21L via the left pump passage 33L and the left supply passage 34L. Therefore, the operating fluid from the left hydraulic pump 21L is supplied to the left traveling directional control valve 31L, and the left traveling hydraulic motor 11L operates with the operating fluid. Furthermore, at the left traveling directional control valve 31L, the spool 31La moves to a position corresponding to the amount of operation on the left foot pedal 52*a*, and the left traveling directional control valve 31L opens with a degree of opening corresponding to the amount of the operation on the left foot pedal 52*a*. Thus, the operating fluid is supplied to the left traveling hydraulic motor 11L at a flow rate corresponding to the degree of opening, allowing the left traveling hydraulic motor 11L to rotate at a rotational speed that corresponds to the amount of the operation on the left foot pedal 52*a*. In other words, it is possible to cause the left crawler 5L to move at a speed corresponding to the amount of the operation on the left foot pedal 52*a*.

When only the right foot pedal 52*b* is operated, the control unit 50 first operates the right unloader valve 45R and closes the right tank passage 46R. Furthermore, the control unit 50 outputs a traveling command signal to the electromagnetic proportional control valve 31Rb (or the electromagnetic proportional control valve 31Rc) and operates the right traveling directional control valve 31R. Accordingly, the right traveling hydraulic motor 11R rotates at a speed corresponding to the amount of operation on the right foot pedal 52*b*, meaning that it is possible to cause the right crawler 5R to move at a speed corresponding to the amount of the operation on the right foot pedal 52*b*. In contrast, for example, in the case of causing the excavator 3 to travel straight while moving the boom, the turning body, and the like, that is, for example, in the case where both the foot pedals 52*a*, 52*b* are operated during the boom operation and the turning operation, the control unit 50 operates as follows.

Specifically, when a signal is output from the traveling operation device 52 in the state where both the foot pedals 52*a*, 52*b* are operated, the control unit 50 outputs a switch command signal to the switching electromagnetic proportional control valve 35 connected to the straight travel valve 30 and causes the spool 30*a* to move the second position A2. Thus, the function of the straight travel valve 30 switches to the second function. This means that the left pump passage 33L is connected to the right supply passage 34R, and the right pump passage 33R is connected to the left supply passage 34L. Thus, both the left traveling directional control valve 31L and the right traveling directional control valve 31R are connected to the right hydraulic pump 21R, and the turning directional control valve 32 is connected to the left hydraulic pump 21L. Furthermore, the left traveling directional control valve 31L and the right traveling directional control valve 31R open with degrees of opening corresponding to the amounts of operation on the foot pedals 52*a*, 52*b*, and the operating fluid is guided to the hydraulic motors 11L, 11R at flow rates corresponding to the amounts of operation on the foot pedals 52*a*, 52*b*. Thus, it is possible to cause the hydraulic motors 11L, 11R to rotate at speeds corresponding to the amounts of operation on the foot pedals 52*a*, 52*b*, meaning that it is possible to cause the excavator 3 to travel straight at a speed corresponding to the amounts of operation on the foot pedals 52*a*, 52*b*.

Connecting both the pair of the left and right traveling hydraulic motors 11L, 11R to one hydraulic pump 21R at the time of traveling straight as mentioned above provides the following advantages. Specifically, in the case where the pair of the left and right traveling hydraulic motors 11L, 11R are connected to separate hydraulic pumps 21L, 21R, when the turning hydraulic motor 12 is operated together with the traveling hydraulic motors 11L, 11R, the operating fluid in the left hydraulic pump 21L is guided to the turning hydraulic motor 12 as well. In this case, there will be a shortage of the operating fluid to be supplied to the left traveling hydraulic motor 11L, and it is not possible to guide the operating fluid to the traveling hydraulic motor 11R at a desired flow rate. Therefore, when both of the two foot pedals 52*a*, 42*b* are operated in order for straight travel, the flow rates of the operating fluid that is supplied to the traveling hydraulic motors 11L, 11R become uneven, causing a reduction in the straight-travel capability of the hydraulic excavator. In contrast, in the case where both the pair of the left and right traveling hydraulic motors 11L, 11R are connected to one hydraulic pump 21R, the operating fluid from the right hydraulic pump 21R is approximately evenly distributed to the traveling hydraulic motors 11L, 11R regardless of whether or not the turning hydraulic motor 12 is operated. Thus, the unevenness in the flow rates of the operating fluid that is supplied to the traveling hydraulic motors 11L, 11R can be reduced, and it is possible to improve the straight-travel capability of the excavator 3 at the time of traveling straight. Note that at the time of simultaneously operating the boom 7, the arm 8, and the bucket 4 except the turning body 6, it is likewise possible to improve the straight-travel capability of the excavator 3.

Figure 3:
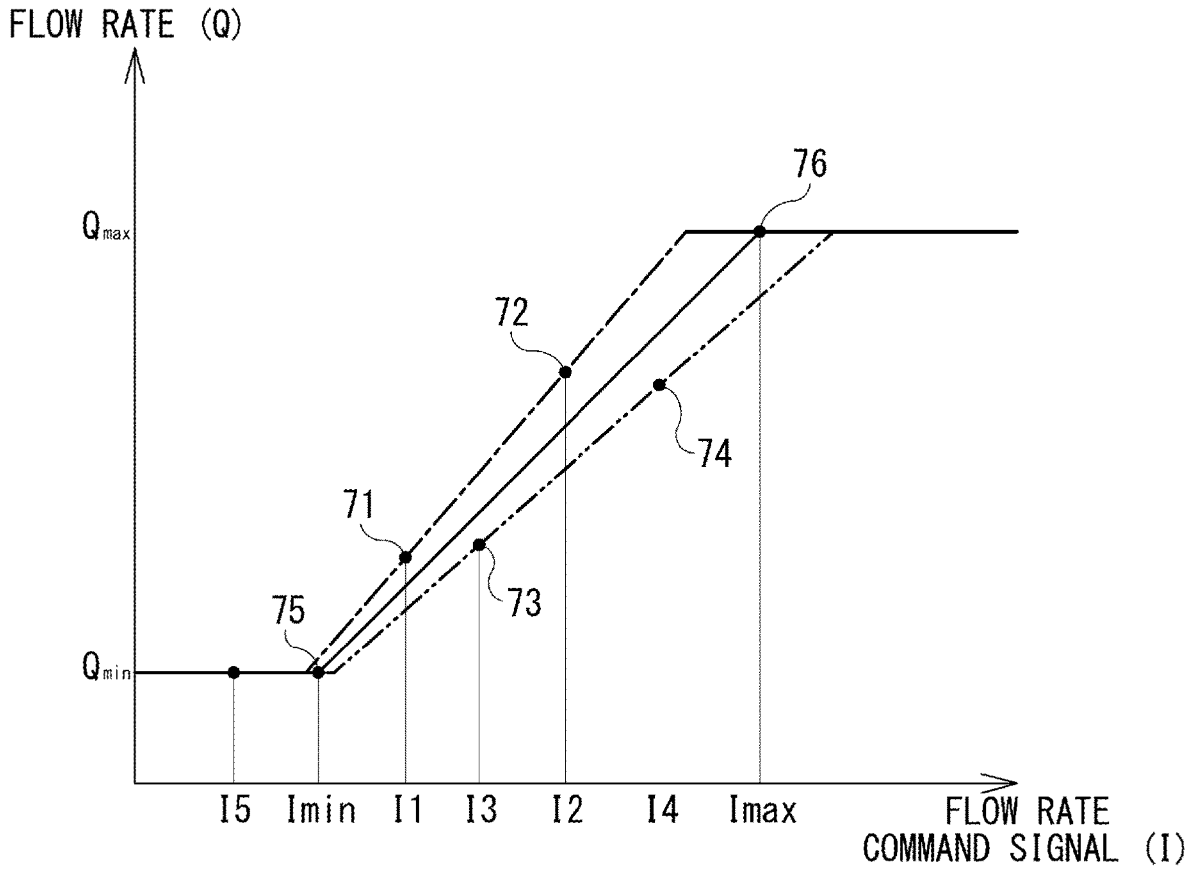
FIG. 3 is a graph illustrating flow rate characteristics of a hydraulic pump in the hydraulic drive system illustrated in FIG. 2.

In the hydraulic drive system 1 configured as described above, the control unit 50 controls the operation of the hydraulic supply device 24 in accordance with the operation performed on the operation devices 51, 52 and operates the hydraulic actuators 11L, 11R, 12. Furthermore, in order to operate the hydraulic actuators 11L, 11R, 12 at speeds corresponding to the amounts of operation on the operation devices 51, 52 (for example, to operate the turning body 6 at a speed corresponding to the amount of the operation on the turning operation lever 51*a*), the control unit 50 operates as follows. Specifically, the control unit 50 controls the degrees of opening of the directional control valves 31L, 31R, 32 and also controls the dispense flow rates of the hydraulic pumps 21L, 21R via the regulators 23L, 23R. More specifically, the hydraulic pumps 21L, 21R have flow rate characteristics such as those illustrated in FIG. 3. Here, the flow rate characteristics indicate the relationship between the dispense flow rate and the tilt angle (that is, the flow rate command signal); in FIG. 3, the horizontal axis represents the flow rate command signal (electric current), and the vertical axis represents the dispense flow rate. As illustrated in FIG. 3, the dispense flow rate of each of the hydraulic pumps 21L, 21R is a minimum flow rate Qmin when the flow rate command signal is less than or equal to or Imin, and increases in proportion to the flow rate command signal when the flow rate command signal exceeds Imin. When the flow rate command signal is greater than or equal to Imax, the dispense flow rate of each of the hydraulic pumps 21L, 21R is a maximum flow rate Qmax.

The control unit 50, in which such flow rate characteristics (the solid line in FIG. 3) are set in advance and stored, calculates, on the basis of the stored flow rate characteristics, namely, reference characteristics, flow rate command signals to be output to the regulators 23L, 23R, and causes the hydraulic pumps 21L, 21R to discharge the operating fluid at flow rates corresponding to the amounts of operation on the hydraulic pumps 21L, 21R. Meanwhile, the reference characteristics may be different from actual flow rate characteristics due to various causes. The control unit 50 including the calibration device functions to calibrate the stored reference characteristics in order to fill this gap. The following describes a hydraulic-pump flow-rate calibration process which is performed using the turning hydraulic motor 12, which is one example of the first hydraulic actuator.

[Hydraulic-Pump Flow-Rate Calibration Process]

Figure 4:
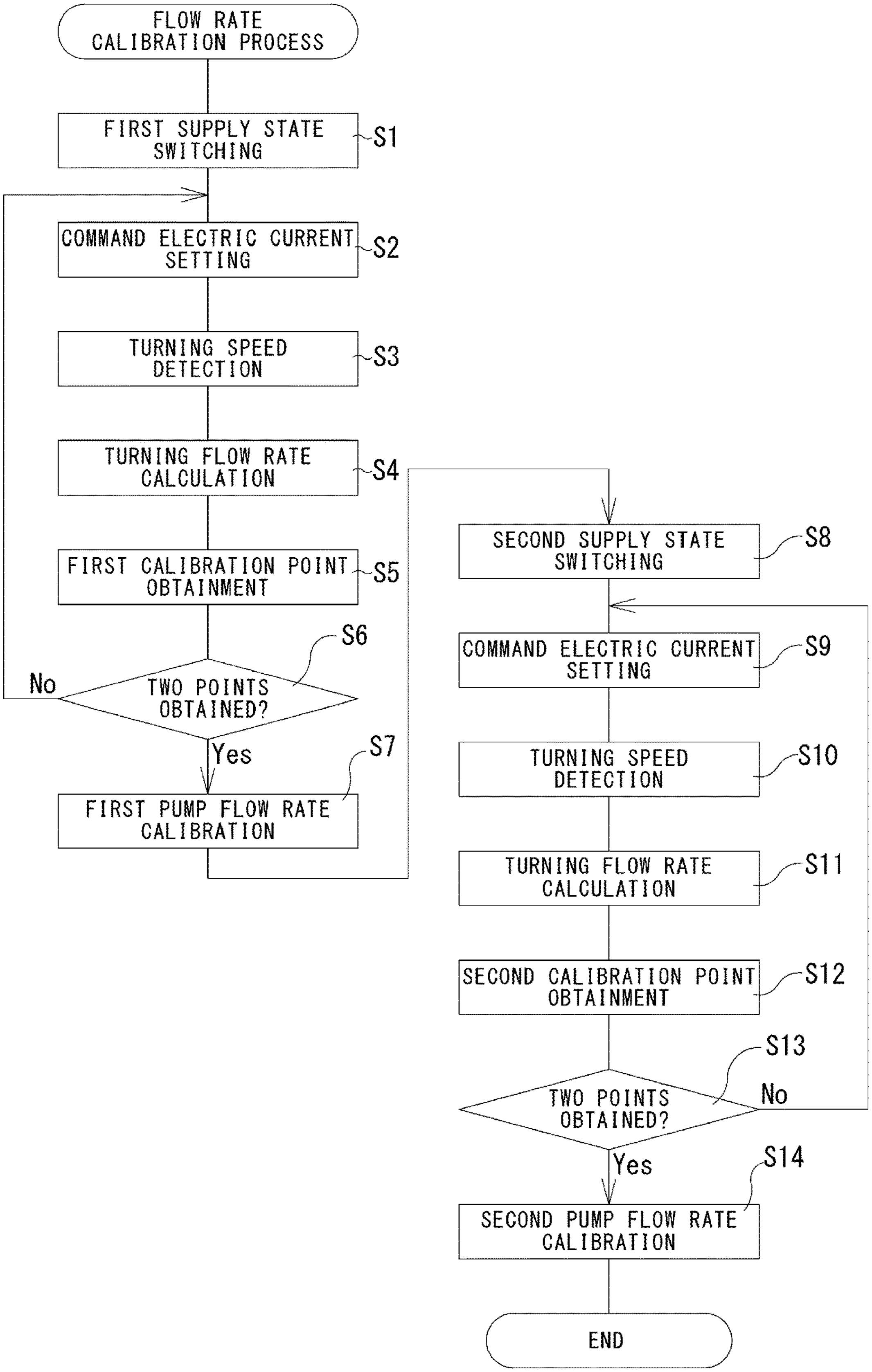
FIG. 4 is a flowchart illustrating the flow of steps in a flow-rate calibration process which is performed by the hydraulic drive system illustrated in FIG. 2.

In the hydraulic drive system 1, which is the hydraulic-pump flow-rate calibration system, first, the control unit 50 determines whether or not a predetermined calibration condition is met. The calibration condition is, for example, that a power switch for the excavator 3 shall be operated and thus electric power shall be supplied to the control unit 50 or that a calibration switch not illustrated in the drawings shall be operated and thus a calibration command shall be input to the control unit 50. Alternatively, the calibration condition may be that a predetermined length of time shall have passed without the operation devices 51, 52 being operated. When the calibration condition is met, the control unit 50 starts the flow rate calibration process such as that illustrated in FIG. 4, and the processing transitions to Step S1.

In Step S1, which is a first supply state switching step, the state of the hydraulic drive system 1 is switched to a first supply state in which the operating fluid dispensed from the right hydraulic pump 21R, which is the first hydraulic pump, is supplied to the turning hydraulic motor 12. Specifically, the control unit 50 outputs signals to the valves 30, 31L, 31R, 32, 45L, 45R, and controls the operation thereof in the following manner. More specifically, the control unit 50 closes the right tank passage 46R by the right unloader valve 45R to prevent bleeding off of the operating fluid that is dispensed from the right hydraulic pump 21R. On the other hand, the left tank passage 46L is completely open by the left unloader valve 45L, and the entire amount of the operating fluid dispensed from the left hydraulic pump 21L returns to the tank 27. At the same time, the control unit 50 places the spool 30*a* of the straight travel valve 30 in the first position A1 to cause the operating fluid dispensed from the right hydraulic pump 21R to be guided to the right supply passage 34R via the straight travel valve 30.

Furthermore, the control unit 50 operates the turning directional control valve 32, in other words, causes the spool 32*a* of the turning directional control valve 32 to slide so that the operating fluid guided to the right supply passage 34R is supplied to the turning hydraulic motor 12. At this time, the spool 32*a* is slid so that the degree of opening of the turning directional control valve 32 reaches the maximum degree. On the other hand, the control unit 50 places each of the spools 31La, 31Ra (including the spools of various directional control valves) of the directional control valves 31L, 31R (including various directional control valves corresponding to the boom cylinder 13, the arm cylinder 14, the bucket cylinder 15, and the like) other than the turning directional control valve 32 in the neutral position, thereby preventing the operating fluid from flowing to the other hydraulic actuators such as the left traveling hydraulic motor 11L (the second hydraulic actuator) and the right traveling hydraulic motor 11R. In this manner, only the spool 32*a* of the turning directional control valve 32 is slid to cause the entire operating fluid in the right hydraulic pump 21R to be supplied to the turning hydraulic motor 12 alone. When the state of the hydraulic supply device 24 is switched to the first supply state in which the entire operating fluid in the right hydraulic pump 21R is supplied to the turning hydraulic motor 12 alone in this manner, the processing transitions to Step S2.

In Step S2, which is a command electric current setting step, a predetermined flow rate command signal I1 (for example, the first flow rate command signal) which is set on the basis of the flow rate characteristics stored in advance is output to the right regulator 23R (for example, the first regulator) provided on the right hydraulic pump 21R (for example, the first hydraulic pump). Here, the flow rate command signal I1 is set in advance to satisfy Imin≤I1≤Imax, on the basis of the aforementioned reference characteristics of the right hydraulic pump 21R, namely, the first reference characteristics (refer to the solid line in FIG. 3), and the set flow rate command signal I1 is output to the right regulator 23R. Accordingly, the swash plate 22R of the right hydraulic pump 21R rotates through a tilt angle corresponding to the flow rate command signal I1, and the operating fluid is dispensed from the right hydraulic pump 21R at a flow rate corresponding to the flow rate command signal I1. Subsequently, when the entire amount of the operating fluid is supplied to the turning hydraulic motor 12 via the straight travel valve 30 and the turning directional control valve 32, the processing transitions to Step S3.

In Step S3, which is a turning speed detection step, the speed of turning of the turning body 6 is detected. Specifically, the control unit 50 detects the speed of turning of the turning body 6 on the basis of the signal output from the gyroscope sensor 60. Note that in the present embodiment, the gyroscope sensor 60 is mounted on the turning body 6 so that the z-axis of the gyroscope sensor 60 is substantially parallel to the pivot of the turning body 6, and the control unit 50 calculates the speed of turning of the turning body 60 by detecting an angular velocity about the z-axis. However, the method for calculating the speed of turning of the turning body 6 is not limited to the aforementioned method; the speed of turning may be calculated on the basis of angular velocities about two or three axes detected on the basis of the signals output from the gyroscope sensor 60. When the speed of turning of the turning body 6 is detected in this manner, the processing transitions to Step S4.

In Step 4, which is a turning flow rate calculation step, the flow rate of the operating fluid supplied to the turning hydraulic motor 12 at the time of turning, namely, a turning flow rate, is calculated. Specifically, the control unit 50 stores, in advance, a swept volume (displacement) of the turning hydraulic motor 12 and a speed reduction ratio between the turning hydraulic motor 12 and the turning body 6, and calculates the turning flow rate on the basis of said swept volume and the speed of turning calculated in Step S3. More specifically, the turning flow rate is calculated by multiplying the speed of turning calculated in Step S3 by the swept volume. When the turning flow rate is calculated, the processing transitions to Step S5.

In Step S5, which is a first calibration point obtainment step, an actual dispense flow rate of the right hydraulic pump 21R is calculated, and a calibration point for the right hydraulic pump 21R is obtained on the basis of the calculated actual dispense flow rate. Specifically, the control unit 50 calculates the dispense flow rate of the right hydraulic pump 21R on the basis of the turning flow rate calculated in Step S4, but, first, for this purpose, calculates an amount of leakage of the operating fluid at the turning hydraulic motor 12, namely, a motor leakage amount. The motor leakage amount changes according to the dispense pressure of the operating fluid supplied to the turning hydraulic motor 12, and the control unit 50 calculates the motor leakage amount on the basis of the dispense pressure of the right hydraulic pump 21R and motor efficiency characteristics of the turning hydraulic motor 12. Here, the dispense pressure of the right hydraulic pump 21R is detected on the basis of the signal from the right pressure sensor 62R, and the motor efficiency characteristics of the turning hydraulic motor 12 (characteristics which are related to the usage ratio of the supplied flow and change according to the pressure) is stored in the control unit 50 in advance. When the control unit 50 calculates the motor leakage amount, the control unit 50 adds the calculated motor leakage amount to the turning flow rate. Thus, the dispense flow rate (=the turning flow rate+the motor leakage amount) is calculated.

Note that the motor leakage amount does not necessarily need to be calculated on the basis of the dispense pressure of the right hydraulic pump 21R and may be set to a constant value on the basis of the motor efficiency characteristics of the turning hydraulic motor 12. Furthermore, in calculating the dispense flow rate, the motor leakage amount does not necessarily need to be referred to, and the dispense flow rate may be set equal to the turning flow rate. These two cases (specifically, the case where neither the pressure nor the motor leakage amount is referred to) are preferred when there is no need to calibrate the flow rate characteristics on the basis of a more accurate dispense flow rate; in the case where it is preferable to calibrate the first reference characteristics on the basis of a more accurate dispense flow rate, it is preferable that the motor leakage amount be calculated on the basis of the dispense pressure and the motor efficiency characteristics as mentioned above. The same holds true for the dispense flow rate of the left hydraulic pump 21L to be described later.

When the control unit 50 calculates the dispense flow rate, the control unit 50 stores the calculated dispense flow rate in association with the flow rate command signal I1 set in Step S2. For example, in the case where the dispense flow rate applied in response to the flow rate command signal I1 is high compared to the first reference characteristics (the solid line in FIG. 3), a calibration point 71 is obtained, as illustrated in FIG. 3. When the first calibration point, namely, the calibration point 71, is calculated in this manner, the processing transitions to Step S6.

In Step S6, which is a number-of-calibration-points checking step, whether or not two or more calibration points have been obtained is determined at the time of calibrating the first reference characteristics. Note that the number of calibration points to be obtained may be three or more. When the number of calibration points obtained is determined as one, the processing returns to Step S2, and the dispense flow rate of the right hydraulic pump 21R to be applied in response to a flow rate command signal I2 (the first flow rate command signal) having a value different from the value of the flow rate command signal I1 is calculated. Specifically, the control unit 50 outputs, to the right regulator 23R, a flow rate command signal I2 ($Imin \leq I2 \leq Imax$) having a value different from the value of the flow rate command signal I1 in Step S2. When the control unit 50 outputs the set flow rate command signal I2 to the right regulator 23R, then the control unit 50 detects the speed of turning (Step S3) and further calculates the turning flow rate on the basis of the speed of turning detected in Step S3 (Step S4). Furthermore, the control unit 50 calculates the dispense flow rate on the basis of the turning flow rate detected in Step S4, and stores the calculated dispense flow rate and the flow rate command signal I2 in association with each other. When the second calibration point, namely, a calibration point 72, is obtained in this manner (refer to FIG. 3), the processing transitions to Step S7.

In Step S7, which is a first pump flow rate calibration step, the first reference characteristics are calibrated on the basis of the two calibration points 71, 72 obtained in Step S5. Specifically, in the range where the flow rate Q satisfies the relationship: $Qmin \leq Q \leq Qmax$, a straight line passing through the two calibration points 71, 72 (refer to the dot-dashed line in FIG. 3) is calculated as first actual measurement characteristics, which are actual flow rate characteristics of the right hydraulic pump 21R. More specifically, the control unit 50 calculates, on the basis of the two calibration points 71, 72, a slope and an intercept of the first actual measurement characteristics in the range $Qmin \leq Q \leq Qmax$, calculates the first actual measurement characteristics, and sets the calculated first actual measurement characteristics as new first reference characteristics. When the first reference characteristics are calibrated on the basis of the first actual measurement characteristics in this manner, the processing transitions to Step S8.

In Step S8, which is a second supply state switching step, the state of the hydraulic drive system 1 is switched to a second supply state in which the operating fluid dispensed from the left hydraulic pump 21L, which is the second hydraulic pump, is supplied to the turning hydraulic motor 12. Specifically, the control unit 50 outputs signals to the valves 30, 31L, 31R, 32, 45L, 45R, and controls the operation thereof in the following manner. More specifically, the control unit 50 closes the left tank passage 46L by the left unloader valve 45L to prevent bleeding off of the operating fluid that is dispensed from the left hydraulic pump 21L. On the other hand, the right tank passage 46R is completely open by the right unloader valve 45R, and the entire amount of the operating fluid dispensed from the right hydraulic pump 21R returns to the tank 27. At the same time, the control unit 50 places the spool 30*a* of the straight travel valve 30 in the second position A2 to cause the operating fluid dispensed from the left hydraulic pump 21L to be guided to the right supply passage 34R via the straight travel valve 30. Furthermore, as in Step S2, the control unit 50 slides only the spool 32*a* of the turning directional control valve 32 to cause the entire operating fluid in the left hydraulic pump 21L to be supplied to the turning hydraulic motor 12 alone. On the other hand, the control unit 50 places each of the spools 31La, 31Ra (including the spools of various directional control valves) of the directional control valves 31L, 31R (including various directional control valves corresponding to the boom cylinder 13, the arm cylinder 14, the bucket cylinder 15, and the like) other than the turning directional control valve 32 in the neutral position, thereby preventing the operating fluid from flowing to the other hydraulic actuators such as the left traveling hydraulic motor 11L (the second hydraulic actuator) and the right traveling hydraulic motor 11R. When the state of the hydraulic supply device 24 is switched to the second supply state in which the entire operating fluid in the left hydraulic pump 21L is supplied to the turning hydraulic motor 12 alone in this manner, the processing transitions to Step S9.

In Step S9, which is the command electric current setting step, a predetermined flow rate command signal I3 (for example, the second flow rate command signal) which is set on the basis of the flow rate characteristics stored in advance is output to the left regulator 23L (for example, the second regulator) provided on the left hydraulic pump 21L (for example, the second hydraulic pump). Here, as with the flow rate command signal I1 mentioned above, the flow rate command signal I3 is set in advance to satisfy Imin≤I3≤Imax, on the basis of the reference characteristics for the left hydraulic pump 21L, namely, the second reference characteristics (refer to the solid line in FIG. 3), and the set flow rate command signal I3 is output to the left regulator 23L. Note that in the present embodiment, the same reference characteristics are set for the two hydraulic pumps 21L, 21R, but the reference characteristics do not necessarily need to be the same, and different reference characteristics may be set in advance. Furthermore, in the present embodiment, the flow rate command signal I3 is set to a value different from the value of the flow rate command signal I1, but may be set to the same value as the value of the flow rate command signal I1. As a result of the flow rate command signal I3 being output to the left regulator 23L, the swash plate 22L of the left hydraulic pump 21L rotates through a tilt angle corresponding to the flow rate command signal I3, and the operating fluid is dispensed from the left hydraulic pump 21L at a flow rate corresponding to the flow rate command signal I3. Subsequently, when the entire amount of the operating fluid is supplied to the turning hydraulic motor 12 via the straight travel valve 30 and the turning directional control valve 32, the processing transitions to Step S10.

In Step S10, which is the turning speed detection step, the speed of turning of the turning body 6 is detected as in Step S3. Specifically, the control unit 50 detects the speed of turning of the turning body 6 on the basis of the signal output from the gyroscope sensor 60, and when the speed of turning of the turning body 6 is calculated, the processing transitions to Step S11. Furthermore, in Step S11, which is the turning flow rate calculation step, the turning flow rate of the turning hydraulic motor 12 at the time of turning is calculated as in Step S4. Specifically, the control unit 50 calculates the turning flow rate on the basis of the swept volume (displacement) of the turning hydraulic motor 12 and the speed reduction ratio between the turning hydraulic motor 12 and the turning body 6, which are stored in advance, and the speed of turning calculated in Step S10, and when the turning flow rate is calculated, the processing transitions to Step S12.

In Step S12, which is a second calibration point obtainment step, an actual dispense flow rate of the left hydraulic pump 21L is calculated, and a calibration point for the left hydraulic pump 21L is obtained on the basis of the calculated actual dispense flow rate. Specifically, the control unit 50 calculates the dispense flow rate of the left hydraulic pump 21L on the basis of the turning flow rate calculated in Step S11, but, first, for this purpose, detects the dispense pressure of the left hydraulic pump 21L on the basis of the signal from the left pressure sensor 62L. Subsequently, the control unit 50 calculates the motor leakage amount of the turning hydraulic motor 12 on the basis of the detected dispense pressure of the left hydraulic pump 21L and the motor efficiency characteristics of the turning hydraulic motor 12. Lastly, the control unit 50 calculates a dispense flow rate by adding the calculated motor leakage amount to the turning flow rate. When the dispense flow rate is calculated, the control unit 50 stores the calculated dispense flow rate in association with the flow rate command signal I3 set in Step S9. For example, in the case where the dispense flow rate applied in response to the flow rate command signal I3 is low compared to the second reference characteristics (the solid line in FIG. 3), a calibration point 73 is obtained, as illustrated in FIG. 3. When the first calibration point, namely, a calibration point 73, is obtained in this manner, the processing transitions to Step S13.

In Step S13, which is the number-of-calibration-points checking step, whether or not two or more calibration points have been obtained is determined at the time of calibrating the second reference characteristics. Note that the number of calibration points to be obtained may be three or more. When the number of calibration points obtained is determined as one, the processing returns to Step S9, and the dispense flow rate of the left hydraulic pump 21L to be applied in response to a flow rate command signal I4 (the second flow rate command signal) having a value different from the value of the flow rate command signal I3 is calculated. Specifically, the control unit 50 outputs, to the left regulator 23L, a flow rate command signal I4 (Imin≤I4≤Imax) having a value different from the value of the flow rate command signal I3 in Step S9. Note that in the present embodiment, the flow rate command signal I4 is set to a value different from the value of the flow rate command signal I2, but may be set to the same value as the value of the flow rate command signal I1. When the control unit 50 outputs the set flow rate command signal I4 to the left regulator 23L, then the control unit 50 detects the speed of turning (Step S10) and further calculates the turning flow rate on the basis of the speed of turning detected in Step S10 (Step S11). Furthermore, the control unit 50 calculates the dispense flow rate on the basis of the turning flow rate detected in Step S11, and stores the calculated dispense flow rate and the flow rate command signal I4 in association with each other. When the second calibration point, namely, a calibration point 74, is obtained in this manner (refer to FIG. 3), the processing transitions from Step S13 to Step S14.

In Step S14, which is a second pump flow rate calibration step, the second reference characteristics are calibrated on the basis of the two calibration points 73, 74 obtained in Step S12. Specifically, in the range where the flow rate Q satisfies the relationship: Qmin≤Q≤Qmax, a straight line passing through the two calibration points 73, 74 (refer to the double-dot-dashed line in FIG. 3) is calculated as second actual measurement characteristics, which are actual flow rate characteristics of the left hydraulic pump 21L. More specifically, the control unit 50 calculates, on the basis of the two calibration points 73, 74, a slope and an intercept of the second actual measurement characteristics in the range Qmin≤Q≤Qmax, calculates the second actual measurement characteristics, and sets the calculated second actual measurement characteristics as new second reference characteristics. When the second reference characteristics are calibrated on the basis of the second actual measurement characteristics in this manner, the flow rate calibration process ends.

Thus, the hydraulic drive system 1 performs the flow rate calibration process described above and is capable of calibrating the flow rate characteristics of the two hydraulic pumps 21L, 21R in the state where the hydraulic drive system 1 is mounted on the excavator 3. Therefore, in the excavator 3 with the hydraulic drive system 1 mounted thereon, the dispense flow rates of the two hydraulic pumps 21L, 21R can be controlled with high accuracy. Furthermore, the hydraulic drive system 1 can calculate the dispense flow rates of the two hydraulic pumps 21L, 21R on the basis of the speed of turning detected by the gyroscope sensor 60 and calibrate the flow rate characteristics on the basis of the calculated dispense flow rates. This means that in the hydraulic drive system 1, the flow rate characteristics of the two hydraulic pumps 21L, 21R can be calibrated without addition of a flow rate sensor, and it is possible to minimize an increase in the number of components for the purpose of calibration.

Embodiment 2

Figure 5:
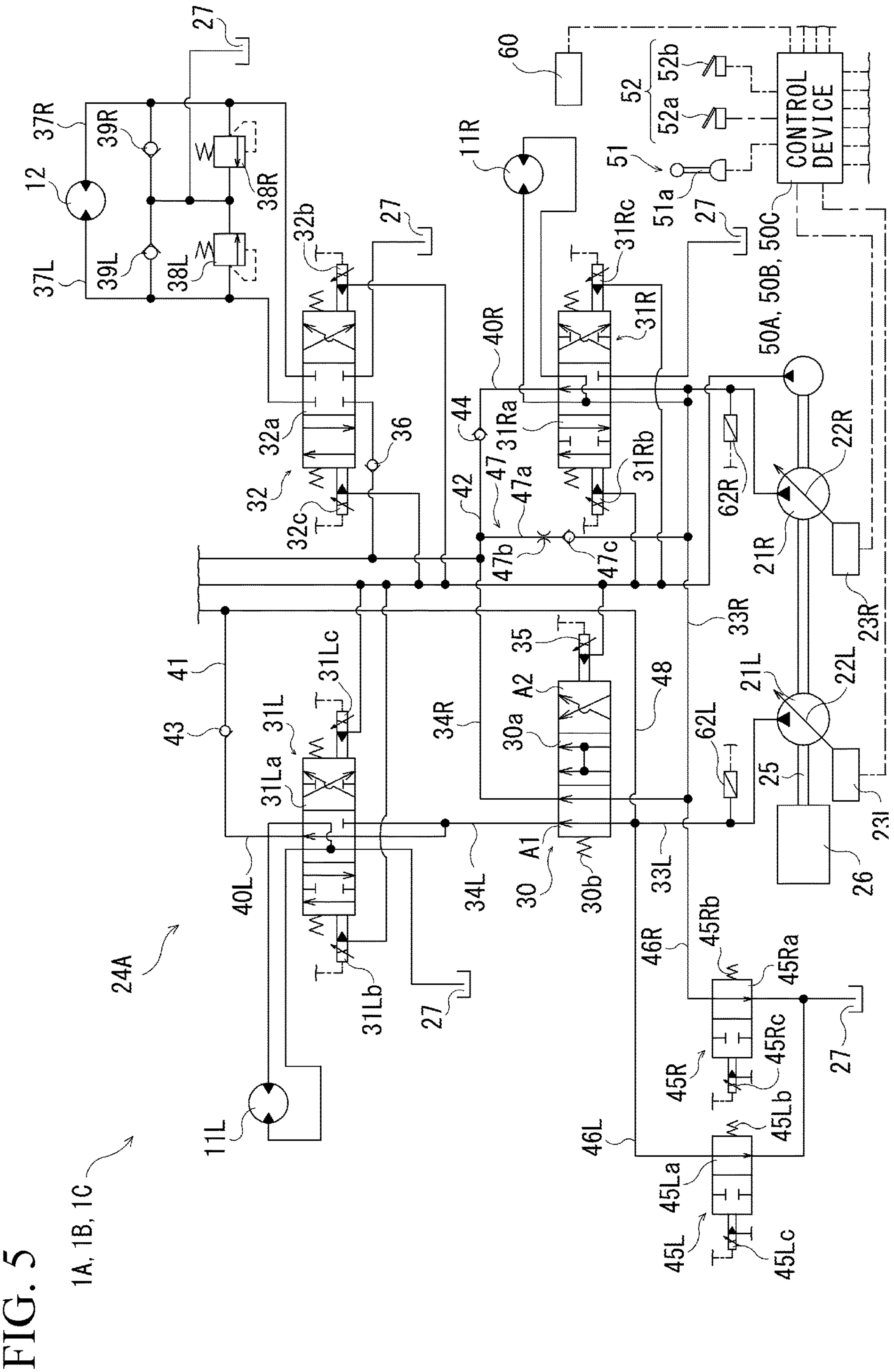
FIG. 5 is a hydraulic circuit representing a hydraulic drive system according to each of Embodiments 2 to 4.

A hydraulic drive system 1A according to Embodiment 2 is similar in configuration to the hydraulic drive system 1 according to Embodiment 1, as illustrated in FIG. 5. Therefore, the configuration of the hydraulic drive system 1A according to Embodiment 2 will be described focusing on differences from the hydraulic drive system 1 according to Embodiment 1; elements that are the same as those of the hydraulic drive system 1 according to Embodiment 1 share the same reference signs, and as such, description of the elements will be omitted.

A hydraulic supply device 24A in the hydraulic drive system 1A according to Embodiment 2 further includes a replenishing unit 47 in addition to the configuration of the hydraulic supply device 24 in the hydraulic drive system 1 according to Embodiment 1, and the replenishing unit 47 has the following function. Specifically, when the flow rate of the operating fluid flowing to the right pump passage 33R is insufficient, the replenishing unit 47 guides the operating fluid from the right supply passage 34R to the right pump passage 33R to replenish the right pump passage 33R with the operating fluid. More specifically, the replenishing unit 47 include a replenishing passage 47*a*, a throttle 47*b*, and a check valve 47*c*. The replenishing passage 47*a* is formed to provide a bridge between the right bypass passage 34R and the right pump passage 33R. Furthermore, in the replenishing passage 47*a*, the throttle 47*b* and the check valve 47*c* are located; the throttle 47*b* and the check valve 47*c* are arranged in the replenishing passage 47*a* in the stated order from the right supply passage 34R side. The check valve 47*c* disposed as just described allows the flow of the operating fluid from the right supply passage 34R toward the right pump passage 33R and blocks the opposite flow of the operating fluid.

The hydraulic drive system 1A configured as described above operates in substantially the same manner as the hydraulic drive system 1 according to Embodiment 1, but is different from the hydraulic drive system 1 according to Embodiment 1 as follows. Specifically, for example, when both the foot pedals 52*a*, 52*b* are operated during the boom operation and the turning operation, both the two hydraulic motors 11L, 11R are connected to the right hydraulic pump 21R. This means that the operating fluid is supplied from the right hydraulic pump 21R to the two hydraulic motors 11L, 11R. Therefore, when the amounts of operation on the foot pedals 52*a*, 52*b* are both great, the dispense flow rate of the right hydraulic pump 21R alone may be insufficient at the time of supplying the operating fluid to the two hydraulic motors 11L, 11R. In such a case, the hydraulic drive system 1A is capable of supplementing the insufficient flow rate by supplying the operating fluid from the right supply passage 34R to the right pump passage 33R via the replenishing unit 47.

The hydraulic drive system 1A having such a function can further calibrate the flow rate characteristics of the two hydraulic pumps 21L, 21R in substantially the same flow rate calibration process as with the hydraulic drive system 1 according to Embodiment 1. However, since the replenishing unit 47 is provided, a portion of the operating fluid dispensed from the left hydraulic pump 21L returns from the replenishing unit 47 to the tank 27 at the time of supplying the operating fluid from the left hydraulic pump 21L to the turning hydraulic motor 12 in Steps S9 to S11, meaning that it is not possible to accurately calculate the dispense flow rate of the left hydraulic pump 21L. Thus, in order to accurately calculate the dispense flow rate of the left hydraulic pump 21L and obtain more accurate flow rate characteristics of the two hydraulic pumps 21L, 21R, a control unit 50A in the hydraulic drive system 1A performs the following flow rate calibration process. Specifically, the control unit 50A determines whether or not a predetermined calibration condition is met, and when the calibration condition is met, performs a flow rate calibration process such as that illustrated in FIG. 6. When the flow rate calibration process is performed, the processing transitions to Step S1, then the control unit 50A performs Steps S1 to S5 to calibrate the flow rate of the right hydraulic pump 21R, which is the first hydraulic pump, as with the hydraulic system 1 according to Embodiment 1.

Figure 7:
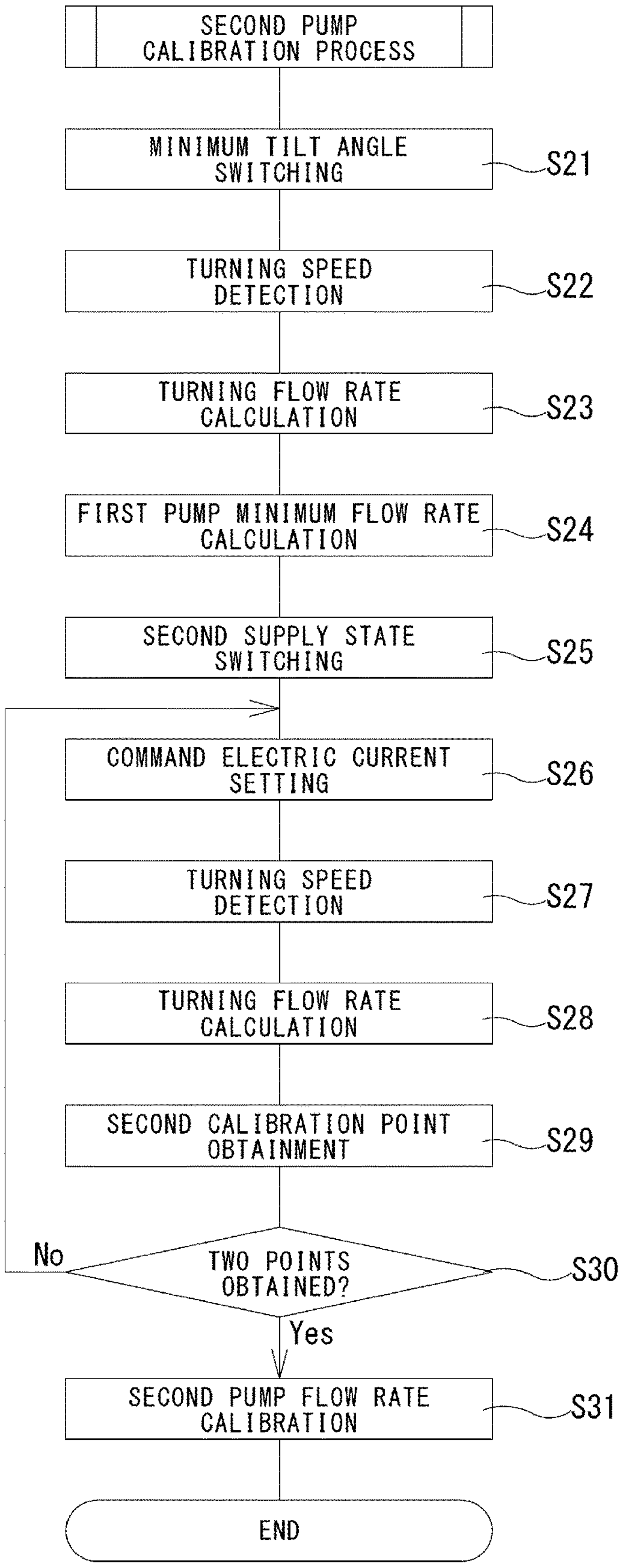
FIG. 7 is a flowchart illustrating the flow of steps in a second pump calibration process which is performed by a hydraulic drive system according to Embodiment 2.

Specifically, when the flow rate calibration process is started, first, the state of the hydraulic drive system 1A is switched to the first supply state (Step S1), and then the flow rate command signal I1 is set and output to the right regulator 23R (Step S2). After the output, the speed of turning is detected (Step S3), and the turning flow rate is calculated on the basis of the speed of turning detected in Step S3 (Step S4). Furthermore, the control unit 50A calculates the dispense flow rate on the basis of the turning flow rate detected in Step S4 and stores the calculated flow rate and the flow rate command signal I1 in association with each other, in other words, obtains the calibration point 71 (refer to FIG. 3) (Step S5). Moreover, since the obtained calibration point is the first calibration point, the processing returns from Step S6 to Step S2, the flow rate command signal 12 is output to the right regulator 23R, and the second calibration point, namely, the calibration point 72, is obtained (Steps S3 to S5). Subsequently, when it is determined that the two calibration points 71, 72 have been obtained (Step S6), the first actual measurement characteristics are calculated on the basis of the two calibration points 71, 72, and the calculated first actual measurement characteristics are set as new first reference characteristics (Step S7). When the first reference characteristics are calibrated on the basis of the first actual measurement characteristics in this manner, the processing transitions to Step S20. In Step S20, the second pump calibration process such as that illustrated in FIG. 7 is performed, and the processing transitions to Step S21.

In Step S21, which is a minimum tilt angle switching step, the swash plate 22R of the right hydraulic pump 21R rotates up to the minimum tilt angle. Specifically, the control unit 50A sets a flow rate command signal I5 (≤Imin) on the basis of the first reference characteristics so that the tilt angle of the swash plate 22R becomes the minimum tilt angle, and outputs the set flow rate command signal I5 to the right regulator 23R. Accordingly, the swash plate 22R of the right hydraulic pump 21R rotates up to the minimum tilt angle, and the operating fluid is dispensed from the right hydraulic pump 21R at the minimum flow rate Qmin. Subsequently, when the entire amount of the operating fluid is supplied to the turning hydraulic motor 12 via the straight travel valve 30 and the turning directional control valve 32, the processing transitions to Step S22.

In Step S22, which is the turning speed detection step, the speed of turning of the turning body 6 is detected as in Step S3 and the like. Specifically, the control unit 50A detects the speed of turning of the turning body 6 on the basis of the signal output from the gyroscope sensor 60, and when the speed of turning of the turning body 6 is calculated, the processing transitions to Step S23. Furthermore, in Step S23, which is the turning flow rate calculation step, the turning flow rate of the turning hydraulic motor 12 at the time of turning is calculated as in Step S4 and the like. Specifically, the control unit 50A calculates the turning flow rate on the basis of the swept volume of the turning hydraulic motor 12 and the speed reduction ratio between the turning hydraulic motor 12 and the turning body 6, which are stored in advance, and the speed of turning calculated in Step S22, and when the turning flow rate is calculated, the processing transitions to Step S24.

In Step S24, which is a first pump minimum flow rate calculation step, the minimum flow rate Qmin of the right hydraulic pump 21R is calculated. Specifically, as in Step S5 and the like, the control unit 50A calculates the minimum flow rate Qmin of the right hydraulic pump 21R on the basis of the turning flow rate calculated in Step S23, but, first, for this purpose, detects the dispense pressure of the right hydraulic pump 21R on the basis of the signal from the right pressure sensor 62R. Subsequently, the control unit 50A calculates the motor leakage amount of the turning hydraulic motor 12 on the basis of the detected dispense pressure of the right hydraulic pump 21R and the motor efficiency characteristics of the turning hydraulic motor 12. Lastly, the control unit 50A calculates the minimum flow rate Qmin by adding the calculated motor leakage amount to the turning flow rate. When the minimum flow rate Qmin is calculated, the processing transitions to Step S25.

In Step S25, which is the second supply state switching step, the state of the hydraulic drive system 1A is switched to the second supply state in which the operating fluid dispensed from the left hydraulic pump 21L, which is the second hydraulic pump, is supplied to the turning hydraulic motor 12. Specifically, the control unit 50A closes the left tank passage 46L by the left unloader valve 45L and at the same time, closes the right tank passage 46R by the right unloader valve 45R. At the same time, the control unit 50A places the spool 30*a* of the straight travel valve 30 in the second position A2. When the state of the hydraulic supply device 24A is switched to the second supply state in this manner, the processing transitions to Step S26.

In Step S26, which is the command electric current setting step, the predetermined flow rate command signal I3 which is set on the basis of the flow rate characteristics stored in advance is output to the left regulator 23L, as in Step S9. The swash plate 22L of the left hydraulic pump 21L rotates through a tilt angle corresponding to the flow rate command signal I3, and the operating fluid is dispensed from the left hydraulic pump 21L at a flow rate corresponding to the flow rate command signal I3. Subsequently, the operating fluid is supplied to the turning hydraulic motor 12 via the straight travel valve 30 and the turning directional control valve 32. Furthermore, the control unit 50A outputs the flow rate command signal I5 to the right regulator 23R and causes the right hydraulic pump 21R to dispense the operating fluid at the dispense flow rate calculated in Step S24, namely, the minimum flow rate Qmin. The operating fluid dispensed from the right hydraulic pump 21R in this manner is guided to the right supply passage 34R via the bypass passage 40R and the replenishing passage 42 because the right tank passage 46R is closed; in the right supply passage 34R, the operating fluid dispensed from the right hydraulic pump 21R merges with the operating fluid dispensed from the left hydraulic pump 21L and is supplied to the turning hydraulic motor 12 together with the operating fluid dispensed from the left hydraulic pump 21L. When the operating fluid after the merging is supplied to the turning hydraulic motor 12 via the straight travel valve 30 and the turning directional control valve 32, the processing transitions to Step S27.

In Step S27, which is the turning speed detection step, the speed of turning of the turning body 6 is detected as in Step S9. Specifically, the control unit 50A detects the speed of turning of the turning body 6 on the basis of the signal output from the gyroscope sensor 60, and when the speed of turning of the turning body 6 is detected, the processing transitions to Step S28. Furthermore, in Step S28, which is the turning flow rate calculation step, the turning flow rate of the turning hydraulic motor 12 at the time of turning is calculated as in Step S11 and the like. Specifically, the control unit 50A calculates the turning flow rate on the basis of the swept volume of the turning hydraulic motor 12 and the speed reduction ratio between the turning hydraulic motor 12 and the turning body 6, which are stored in advance, and the speed of turning calculated in Step S27, and when the turning flow rate is calculated, the processing transitions to Step S29.

In Step S29, which is the second calibration point obtainment step, an actual dispense flow rate of the left hydraulic pump 21L is calculated, and a calibration point for the left hydraulic pump 21L is obtained on the basis of the calculated actual dispense flow rate. Specifically, the control unit 50A calculates the dispense flow rate of the left hydraulic pump 21L on the basis of the turning flow rate calculated in Step S28, but, first, for this purpose, detects the dispense pressure of the left hydraulic pump 21L on the basis of the signal from the left pressure sensor 62L. Subsequently, the control unit 50A calculates the motor leakage amount of the turning hydraulic motor 12 on the basis of the detected dispense pressure of the left hydraulic pump 21L and the motor efficiency characteristics of the turning hydraulic motor 12. Subsequently, the calculated motor leakage amount is added to the turning flow rate to calculate the dispense flow rate; the dispense flow rate calculated in this manner is a total sum of the dispense flow rates of the two hydraulic pumps 21L, 21R, namely, a total flow rate. Thus, in order to calculate the dispense flow rate of the left hydraulic pump 21L, the dispense flow rate of the right hydraulic pump 21R is subtracted from the total flow rate.

Specifically, in Step S26, the flow rate command signal I5 is output to the right regulator 23R so that the right hydraulic pump 21R dispenses the operating fluid at a predetermined dispense flow rate, that is, the minimum flow rate Qmin, meaning that the dispense flow rate of the right hydraulic pump 21R is known from Step S24. Therefore, the control unit 50A calculates the dispense flow rate of the left hydraulic pump 21L (=the turning flow rate+the motor leakage amount−the minimum flow rate Qmin) by subtracting the known dispense flow rate, that is, the minimum flow rate Qmin (correction flow rate), from the total flow rate. When the dispense flow rate of the left hydraulic pump 21L is calculated, the control unit 50A stores the calculated dispense flow rate in association with the flow rate command signal I3 set in Step S26, meaning that the control unit 50A obtains the calibration point 73 (refer to FIG. 3). When the first calibration point, namely, the calibration point 73, is obtained in this manner, the processing transitions to Step S30.

In Step S30, which is the number-of-calibration-points checking step, whether or not two or more calibration points have been obtained is determined at the time of calibrating the second reference characteristics. Note that the number of calibration points to be obtained may be three or more. When the number of calibration points obtained is determined as one, the processing returns to Step S26, the flow rate command signal I4 is output to the left regulator 23L, then the speed of turning is detected (Step S27), and furthermore, the turning flow rate is calculated on the basis of the speed of turning detected in Step 27 (Step S28). Furthermore, the control unit 50A calculates the dispense flow rate on the basis of the turning flow rate detected in Step S28 and stores the calculated flow rate and the flow rate command signal I4 in association with each other (Step S29). When the second calibration point, namely, the calibration point 74, is obtained in this manner (refer to FIG. 3), the processing transitions from Step S30 to Step S31.

In Step S31, which is the second pump flow rate calibration step, the second reference characteristics are calibrated on the basis of the two calibration points 73, 74 obtained in Step S29, as in Step S14 according to Embodiment 1. Specifically, in the range where the flow rate Q satisfies the relationship: Qmin≤Q≤Qmax, a straight line passing through the two calibration points 73, 74 (refer to the double-dot-dashed line in FIG. 3) is calculated as the second actual measurement characteristics, which are actual flow rate characteristics of the left hydraulic pump 21L. More specifically, the control unit 50A calculates, on the basis of the two calibration points 73, 74, a slope and an intercept of the second actual measurement characteristics in the range Qmin≤Q≤Qmax, calculates the second actual measurement characteristics, and sets the calculated second actual measurement characteristics as new second reference characteristics. When the second reference characteristics are calibrated on the basis of the second actual measurement characteristics in this manner, the second pump calibration process ends, and the flow rate calibration process also ends.

Thus, in the hydraulic drive system 1A, by performing the aforementioned flow rate calibration process, it is possible to more accurately calibrate the flow rate characteristics of the two hydraulic pumps 21L, 21R in the case where the replenishing unit 47 is provided. Therefore, in the excavator 3 with the hydraulic drive system 1A mounted thereon, the dispense flow rates of the two hydraulic pumps 21L, 21R can be controlled with high accuracy.

Aside from this, the hydraulic drive system 1A according to Embodiment 2 produces substantially the same advantageous effects as the hydraulic drive system 1 according to Embodiment 1.

Embodiment 3

Figure 6:
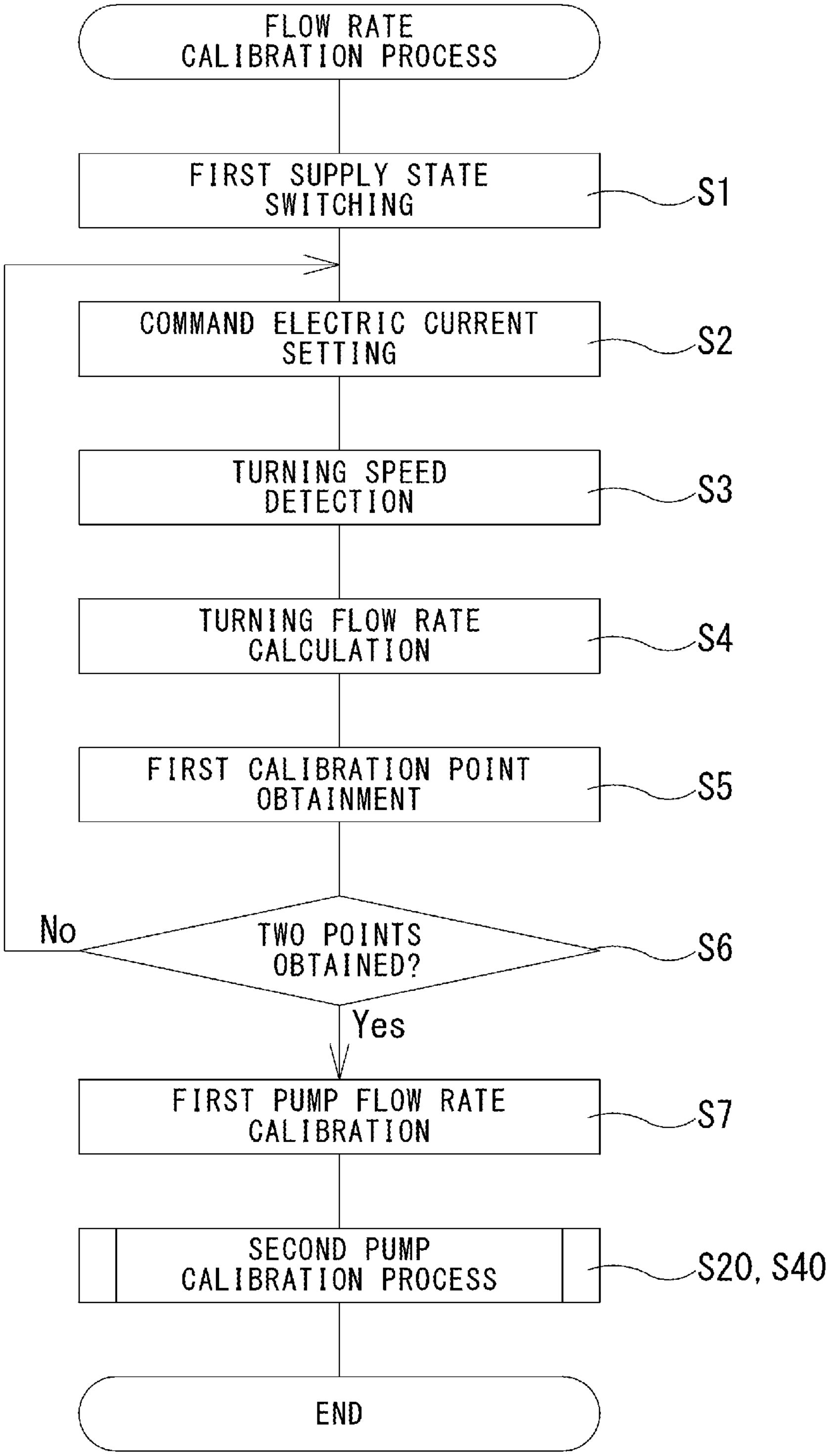
FIG. 6 is a flowchart illustrating the flow of steps in a flow-rate calibration process which is performed by the hydraulic drive system illustrated in FIG. 5.
Figure 8:
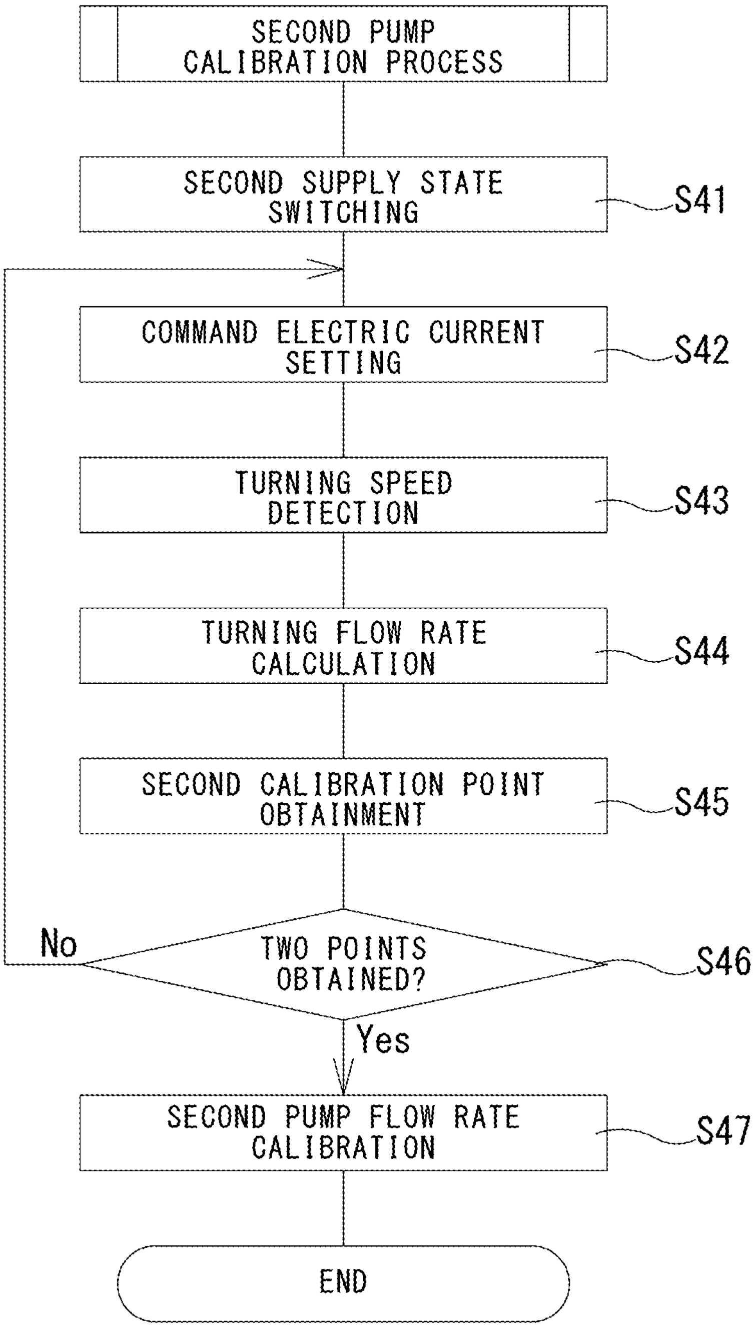
FIG. 8 is a flowchart illustrating the flow of steps in a second pump calibration process which is performed by a hydraulic drive system according to Embodiment 3.

A hydraulic drive system 1B according to Embodiment 3 has the same configuration as the hydraulic drive system 1A according to Embodiment 2, as illustrated in FIG. 5. However, the second pump calibration process in the flow rate calibration process which is performed by a control unit 50B in the hydraulic drive system 1B is different from that performed by the control unit 50A in the hydraulic drive system 1A according to Embodiment 2. Hereinafter, the second pump calibration process which is performed by the control unit 50B will be described in detail. Specifically, when the control unit 50B performs Steps S1 to S7 of the flow rate calibration process as illustrated in FIG. 6 and the calibration of the flow rate characteristics of the right hydraulic pump 21R, in other words, the calibration of the first reference characteristics, ends, the control unit 50B causes the processing to transition to Step S40, performs the second pump calibration process such as that illustrated in FIG. 8, and causes the processing to transition to Step S41.

In Step S41, which is the second supply state switching step, the state of the hydraulic drive system 1B is switched to the second supply state in which the operating fluid dispensed from the left hydraulic pump 21L, which is the second hydraulic pump, is supplied to the turning hydraulic motor 12. Specifically, the control unit 50B completely opens the right tank passage 46R by the right unloader valve 45R, which is one example of the exhaust valve, and closes the left tank passage 46L by the left unloader valve 45L. Furthermore, the control unit 50B places the spool 30*a* of the straight travel valve 30 in the second position A2 and operates the turning directional control valve 32, causing the operating fluid in the right hydraulic pump 21R to be supplied to the turning hydraulic motor 12. When the state of the hydraulic supply device 24A is switched to the second supply state, the processing transitions to Step S42.

In Step S42, which is the command electric current setting step, the predetermined flow rate command signal I3 which is set on the basis of the flow rate characteristics stored in advance is output to the left regulator 23L, as in Step S26. The swash plate 22L of the left hydraulic pump 21L rotates through a tilt angle corresponding to the flow rate command signal I3, and the operating fluid is dispensed from the left hydraulic pump 21L at a flow rate corresponding to the flow rate command signal I3. Subsequently, when the operating fluid is supplied to the turning hydraulic motor 12 via the straight travel valve 30 and the turning directional control valve 32, the processing transitions to Step S43. In Step S43, which is the turning speed detection step, the speed of turning of the turning body 6 is detected as in Step S27. Specifically, the control unit 50B detects the speed of turning of the turning body 6 on the basis of the signal output from the gyroscope sensor 60, and when the speed of turning of the turning body 6 is detected, the processing transitions to Step S44. Furthermore, in Step S44, which is the turning flow rate calculation step, the turning flow rate of the turning hydraulic motor 12 at the time of turning is calculated as in Step S28. Specifically, the control unit 50B calculates the turning flow rate on the basis of the swept volume of the turning hydraulic motor 12 and the speed reduction ratio between the turning hydraulic motor 12 and the turning body 6, which are stored in advance, and the speed of turning calculated in Step S43, and when the turning flow rate is calculated, the processing transitions to Step S45.

In Step S45, which is the second calibration point obtainment step, an actual dispense flow rate of the left hydraulic pump 21L is calculated, and a calibration point for the left hydraulic pump 21L is obtained on the basis of the calculated actual dispense flow rate. Specifically, the control unit 50B calculates the dispense flow rate of the left hydraulic pump 21L on the basis of the turning flow rate calculated in Step S45, but, first, for this purpose, detects the dispense pressure of the left hydraulic pump 21L on the basis of the signal from the left pressure sensor 62L. Subsequently, the control unit 50B calculates the motor leakage amount of the turning hydraulic motor 12 on the basis of the detected dispense pressure of the left hydraulic pump 21L and the motor efficiency characteristics of the turning hydraulic motor 12. Furthermore, the control unit 50B calculates the dispense flow rate of the left hydraulic pump 21L on the basis of the calculated motor leakage amount and turning flow rate.

Specifically, in the hydraulic drive system 1B, the replenishing unit 47 is provided, and the right tank passage 46R is completely open. Therefore, a portion of the operating fluid dispensed from the left hydraulic pump 21L flows to the tank 27 via the replenishing unit 47, the right pump passage 33R, and the tank passage 46R; the control unit 50B calculates an outflow rate Qa, which is the flow rate of the operating fluid flowing to the tank 27, in addition to the motor leakage amount. More specifically, the control unit 50B detects the dispense pressure of the right hydraulic pump 21R on the basis of the signal from the right pressure sensor 62R (first pressure sensor), and calculates the outflow rate Qa on the basis of the detected dispense pressure and the dispense pressure detected by the left pressure sensor 62L (second pressure sensor). In other words, the control unit 50B calculates the outflow rate Qa on the basis of the following Expression 1.

Expression 1

$$Qa = C \times d \times \sqrt{\frac{2(P2 - P1)}{\rho}} \quad \text{Expression 1}$$

Here, C is a flow rate coefficient, d is a throttle diameter that is the diameter of the throttle 47*b*, P1 is the dispense pressure of the right hydraulic pump 21R, P2 is the dispense pressure of the left hydraulic pump 21L, ρ is the liquid density of the operating fluid; the flow rate coefficient C, the throttle diameter d, and the liquid density p are stored by the control unit 50B in advance. When the control unit 50B detects the two dispense pressures P1, P2, the control unit 50B calculates the outflow rate Qa on the basis of these dispense pressures and Expression 1. In other words, the control unit 50B constitutes an outflow rate detection device together with the two pressure sensors 62L, 62R and calculates the outflow rate on the basis of the dispense flow rates P1, P2 detected on the basis of the signals from the two pressure sensors 62L, 62R. Subsequently, the control unit 50B calculates the dispense flow rate of the left hydraulic pump 21L by adding the calculated motor leakage amount and outflow rate Qa to the turning flow rate. When the dispense flow rate of the left hydraulic pump 21L is calculated, the control unit 50B stores the calculated dispense flow rate in association with the flow rate command signal I3 set in Step S42, meaning that the control unit 50B obtains the calibration point 73 (refer to FIG. 3). When the first calibration point, namely, the calibration point 73, is obtained in this manner, the processing transitions to Step S46.

In Step S46, which is the number-of-calibration-points checking step, whether or not two or more calibration points have been obtained is determined at the time of calibrating the second reference characteristics. Note that the number of calibration points to be obtained may be three or more. When the number of calibration points obtained is determined as one, the processing returns to Step S42, the flow rate command signal I4 is output to the left regulator 23L, then the speed of turning is detected (Step S43), and furthermore, the turning flow rate is calculated on the basis of the speed of turning detected in Step 43 (Step S44). Furthermore, the control unit 50B calculates the dispense flow rate on the basis of the turning flow rate detected in Step S44 and stores the calculated flow rate and the flow rate command signal I4 in association with each other (Step S45). When the second calibration point, namely, the calibration point 74, is obtained in this manner (refer to FIG. 3), the processing transitions from Step S46 to Step S47.

In Step S47, which is the second pump flow rate calibration step, the second reference characteristics are calibrated on the basis of the two calibration points 73, 74 obtained in Step S45, as in Step S14 according to Embodiment 1. Specifically, in the range where the flow rate Q satisfies the relationship: Qmin≤Q≤Qmax, a straight line passing through the two calibration points 73, 74 (refer to the double-dot-dashed line in FIG. 3) is calculated as the second actual measurement characteristics, which are actual flow rate characteristics of the left hydraulic pump 21L. More specifically, the control unit 50B calculates, on the basis of the two calibration points 73, 74, a slope and an intercept of the second actual measurement characteristics in the range Qmin≤Q≤Qmax, calculates the second actual measurement characteristics, and sets the calculated second actual measurement characteristics as new second reference characteristics. When the second reference characteristics are calibrated on the basis of the second actual measurement characteristics in this manner, the second pump calibration process ends, and the flow rate calibration process also ends.

Thus, in the hydraulic drive system 1B, by performing the flow rate calibration process having a different flow of steps compared to the flow of steps for the hydraulic drive system 1A according to Embodiment 2, it is possible to more accurately calibrate the flow rate characteristics of the two hydraulic pumps 21L, 21R, as in the case of the hydraulic drive system 1A. Therefore, in the excavator 3 with the hydraulic drive system 1B mounted thereon, the dispense flow rates of the two hydraulic pumps 21L, 21R can be controlled with high accuracy.

Aside from this, the hydraulic drive system 1B according to Embodiment 3 produces substantially the same advantageous effects as the hydraulic drive system 1A according to Embodiment 2.

Embodiment 4

Figure 9:
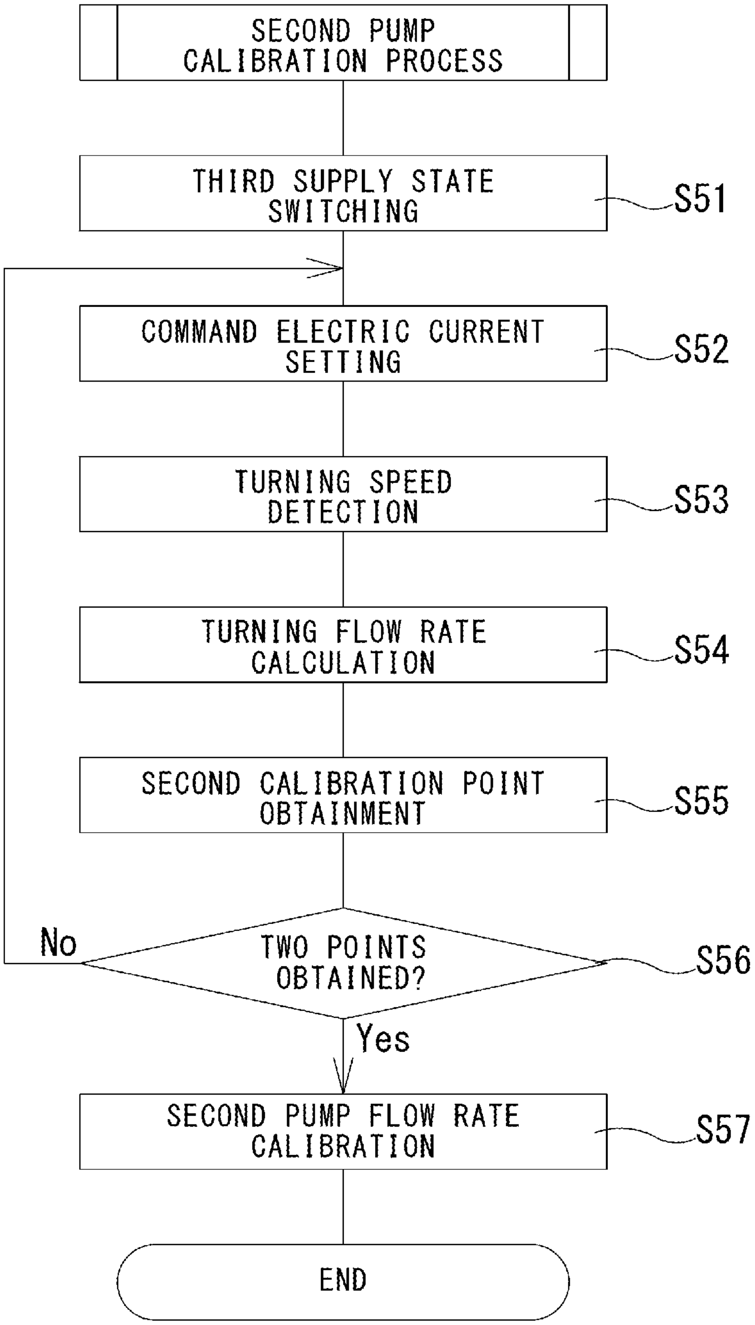
FIG. 9 is a flowchart illustrating the flow of steps in a second pump calibration process which is performed by a hydraulic drive system according to Embodiment 4.

A hydraulic drive system 1C according to Embodiment 4 has the same configuration as the hydraulic drive system 1A according to Embodiment 2, as illustrated in FIG. 5. However, the second pump calibration process in the flow rate calibration process which is performed by a control unit 50C in the hydraulic drive system 1C is completely different from those performed in the hydraulic drive system 1A according to Embodiment 2 and the hydraulic drive system 1B according to Embodiment 3. Hereinafter, the second pump calibration process which is performed by the control unit 50C will be described. Specifically, when the control unit 50C performs Steps S1 to S5 of the flow rate calibration process as illustrated in FIG. 6 and the calibration of the flow rate characteristics of the right hydraulic pump 21R ends, the control unit 50C causes the processing to transition to Step S50, performs the second pump calibration process such as that illustrated in FIG. 9, and causes the processing to transition to Step S51. The processing transitions to Step S51.

In Step S51, which is a third supply state switching step, the state of the hydraulic drive system 1C is switched to a third supply state in which the operating fluid dispensed from the two hydraulic pumps 21L, 21R is supplied to the turning hydraulic motor 12. Specifically, the control unit 50C outputs signals to the valves 30, 31L, 31R, 32, 45L, 45R, and controls the operation thereof in the following manner. More specifically, the control unit 50C closes the left tank passage 46L by the left unloader valve 45L and closes the right tank passage 46R by the right unloader valve 45R. Furthermore, the control unit 50C moves the spool 30*a* of the straight travel valve 30 to the merging function and causes the operating fluid dispensed from the two hydraulic pumps 21L, 21R to merge at the straight travel valve 30 so that the operating fluid is guided to the right supply passage 34R.

The control unit 50C operates the turning directional control valve 32, in other words, causes the spool 32*a* of the turning directional control valve 32 to slide. Accordingly, the operating fluid guided to the right supply passage 34R is supplied to the turning hydraulic motor 12. At this time, the spool 32*a* is slid so that the degree of opening of the turning directional control valve 32 reaches the maximum degree. On the other hand, the control unit 50C places each of the spools 31La, 31Ra (including the spools of various directional control valves) of the directional control valves 31L, 31R (including various directional control valves corresponding to the boom cylinder 13, the arm cylinder 14, the bucket cylinder 15, and the like) other than the turning directional control valve 32 in the neutral position, thereby preventing the operating fluid from flowing to the other hydraulic actuators such as the left traveling hydraulic motor 11L (the second hydraulic actuator) and the right traveling hydraulic motor 11R. In this manner, only the spool 32*a* of the turning directional control valve 32 is slid to cause the entire operating fluid in the two hydraulic pumps 21L, 21R to be supplied to the turning hydraulic motor 12 alone. When the state of the hydraulic supply device 24A is switched to the third supply state in which the entire operating fluid in the two hydraulic pumps 21L, 21R is supplied to the turning hydraulic motor 12 alone in this manner, the processing transitions to Step S52.

In Step S52, which is the command electric current setting step, the predetermined flow rate command signal I3 which is set on the basis of the flow rate characteristics stored in advance is output to the left regulator 23L, as in Steps S26, S42. The swash plate 22L of the left hydraulic pump 21L rotates through a tilt angle corresponding to the flow rate command signal I3, and the operating fluid is dispensed from the left hydraulic pump 21L at a flow rate corresponding to the flow rate command signal I3. Meanwhile, a predetermined flow rate command signal that is the flow rate command signal I5 (≤Imin) in the present embodiment is output to the right regulator 23R as well. The swash plate 22L of the left hydraulic pump 21L rotates up to the minimum tilt angle, meaning that the dispense flow rate of the left hydraulic pump 21L is set to the minimum flow rate Qmin. The entire amount of the operating fluid dispensed from the two hydraulic pumps 21L, 21R in this manner is supplied to the turning hydraulic motor 12 via the straight travel valve 30 and the turning directional control valve 32. When the operating fluid is supplied in this manner, the processing transitions to Step S53.

In Step S53, which is the turning speed detection step, the speed of turning of the turning body 6 is detected as in Step S3 and the like. Specifically, the control unit 50C detects the speed of turning of the turning body 6 on the basis of the signal output from the gyroscope sensor 60, and when the speed of turning of the turning body 6 is calculated, the processing transitions to Step S54. Furthermore in Step S54, which is the turning flow rate calculation step, the turning flow rate of the turning hydraulic motor 12 at the time of turning is calculated as in Step S4 and the like. Specifically, the control unit 50C calculates the turning flow rate on the basis of the swept volume of the turning hydraulic motor 12 and the speed reduction ratio between the turning hydraulic motor 12 and the turning body 6, which are stored in advance, and the speed of turning calculated in Step S53, and when the turning flow rate is calculated, the processing transitions to Step S55.

In Step S55, which is the second calibration point obtainment step, an actual dispense flow rate of the left hydraulic pump 21L is calculated, and a calibration point for the left hydraulic pump 21L is obtained on the basis of the calculated actual dispense flow rate. Specifically, the control unit 50C calculates the dispense flow rate of the left hydraulic pump 21L on the basis of the turning flow rate calculated in Step S54, but, first, for this purpose, detects at least one of the dispense pressures of the two hydraulic pumps 21L, 21R on the basis of the signals from the pressure sensors 62L, 62R. Subsequently, the control unit 50C calculates the motor leakage amount of the turning hydraulic motor 12 on the basis of the detected dispense pressure and the motor efficiency characteristics of the turning hydraulic motor 12. Subsequently, the calculated motor leakage amount is added to the turning flow rate to calculate the dispense flow rate; the dispense flow rate calculated in this manner is a total sum of the dispense flow rates of the two hydraulic pumps 21L, 21R, namely, a total flow rate. Thus, in order to calculate the dispense flow rate of the left hydraulic pump 21L, the dispense flow rate of the right hydraulic pump 21R is subtracted from the total flow rate.

Specifically, in Step S55, the flow rate command signal I5 is output to the right regulator 23R so that the right hydraulic pump 21R dispenses the operating fluid at a predetermined dispense flow rate, that is, the minimum flow rate Qmin. The flow rate characteristics of the right hydraulic pump 21R, namely, the first reference characteristics, have already been calibrated in Step S7, and the dispense flow rate of the right hydraulic pump 21R can be calculated on the basis of the first reference characteristics and the flow rate command signal I5. Therefore, the control unit 50C calculates the dispense flow rate of the left hydraulic pump 21L (=the turning flow rate+the motor leakage amount−the minimum flow rate Qmin) by subtracting the calculated dispense flow rate, that is, the minimum flow rate Qmin (correction flow rate), from the total flow rate. When the dispense flow rate of the left hydraulic pump 21L is calculated, the control unit 50C stores the calculated dispense flow rate in association with the flow rate command signal I3 set in Step S52, meaning that the control unit 50C obtains the calibration point 73 (refer to FIG. 3). When the first calibration point, namely, the calibration point 74, is obtained in this manner, the processing transitions to Step S56.

In Step S56, which is the number-of-calibration-points checking step, whether or not two or more calibration points have been obtained is determined at the time of calibrating the second reference characteristics, as in Step S30 according to Embodiment 2. Note that the number of calibration points to be obtained may be three or more. When the number of calibration points obtained is determined as one, the processing returns to Step S52, the flow rate command signal I4 is output to the left regulator 23L, then the speed of turning is detected (Step S53), and furthermore, the turning flow rate is calculated on the basis of the speed of turning detected in Step S3 (Step S54). Furthermore, the control unit 50C calculates the dispense flow rate on the basis of the turning flow rate detected in Step S54 and stores the calculated flow rate and the flow rate command signal I4 in association with each other (Step S55). When the second calibration point, namely, the calibration point 74, is obtained in this manner (refer to FIG. 3), the processing transitions from Step S56 to Step S57.

In Step S57, which is the second pump flow rate calibration step, the second reference characteristics are calibrated on the basis of the two calibration points 73, 74 obtained in Step S55, as in Step S31 according to Embodiment 2. Specifically, the control unit 50C calculates the second actual measurement characteristics on the basis of the two calibration points 73, 74, and the calculated second actual measurement characteristics are set as new second reference characteristics. When the second reference characteristics are calibrated on the basis of the second actual measurement characteristics in this manner, the second pump calibration process ends, and the flow rate calibration process also ends.

Thus, in the hydraulic drive system 1C, by performing the aforementioned flow rate calibration process, it is possible to more accurately calibrate the flow rate characteristics of the two hydraulic pumps 21L, 21R in the case where the replenishing unit 47 is provided. Therefore, in the excavator 3 with the hydraulic drive system 1C mounted thereon, the dispense flow rates of the two hydraulic pumps 21L, 21R can be controlled with high accuracy.

Embodiment 5

Figure 10:
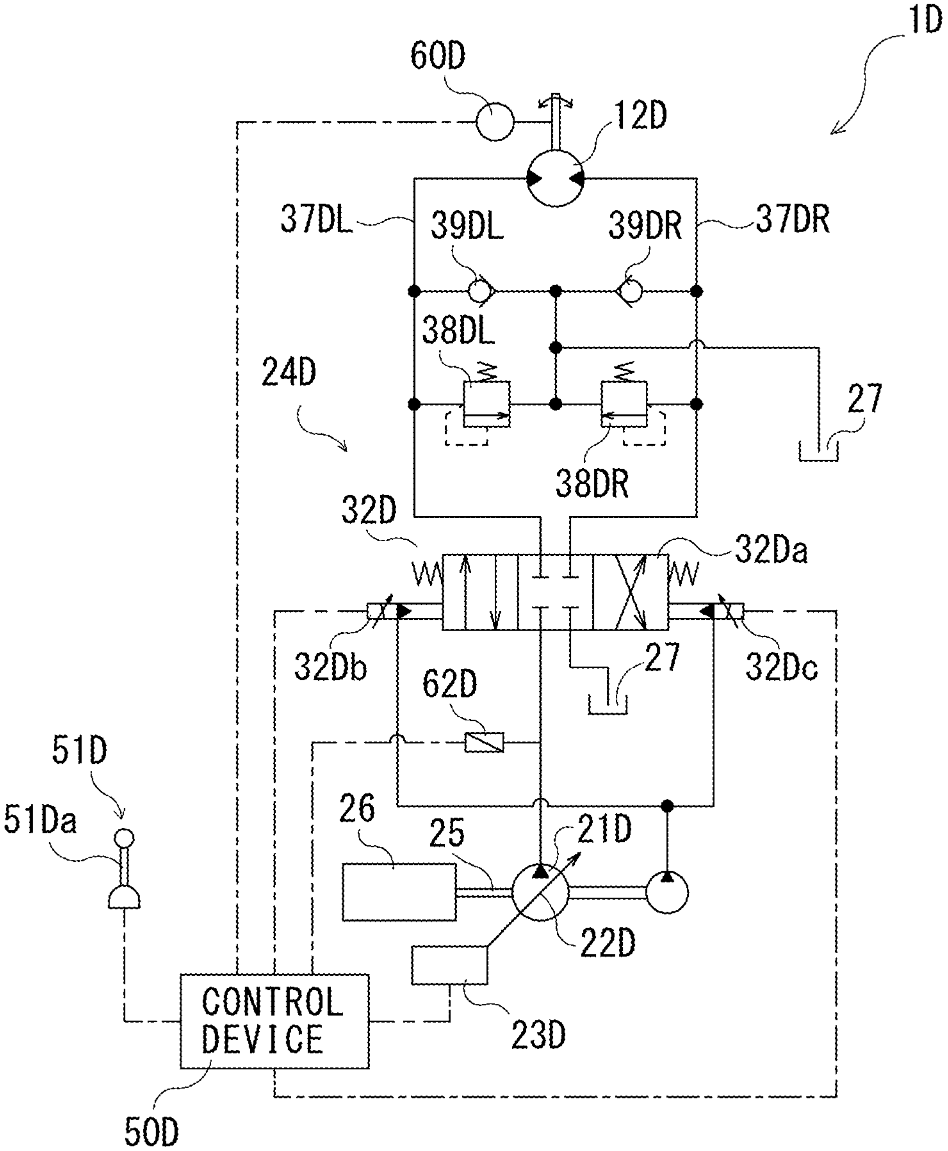
FIG. 10 is a hydraulic circuit representing a hydraulic drive system according to Embodiment 5.

The pump flow rate calibration system may be a hydraulic drive system 1D according to Embodiment 5 to be described below. Specifically, the hydraulic drive system 1D according to Embodiment 5 is a system that drives a hydraulic motor 12D by supplying the operating fluid thereto, as illustrated in FIG. 10, and includes a hydraulic pump 21D, a regulator 23D, and a hydraulic supply device 24D. The hydraulic pump 21D is what is called a variable-capacitance swash plate pump and includes a swash plate 22D. The hydraulic pump 21D is capable of changing a dispense flow rate thereof by rotating the swash plate 22D, and a regulator 23D is provided on the hydraulic pump 21D in order to rotate the swash plate 22D. The regulator 23D adjusts, according to the flow rate command signal input thereto, the tilt angle of the swash plate 22D and controls the dispense flow rate of the hydraulic pump 21D. The hydraulic supply device 24D is connected to the hydraulic pump 21D configured as just described, in order to supply the dispensed operating fluid to the hydraulic motor 12D.

The hydraulic supply device 24D includes a directional control valve 32D and can control the flow and the flow rate of the operating fluid that is supplied to the hydraulic motor 12D. More specifically, the directional control valve 32D is connected to the hydraulic motor 12D and the tank 27 in addition to the hydraulic pump 21D and can switch the connection between the hydraulic motor 12D and each of the hydraulic pump 21D and the tank 27. In other words, the directional control valve 32D includes a spool 32Da and switches said connection by changing the position of the spool 32Da. The spool 32Da receives pilot pressures output from two different electromagnetic proportional control valves 32Db, 32Dc provided at both ends of the spool 32Da and moves from a neutral position in either of the opposite directions in accordance with the difference between the two pilot pressures received. Accordingly, the connection between the hydraulic motor 12D and each of the hydraulic pump 21D and the tank 27 can be switched, and by switching the connection and changing the flow direction of the operating fluid, it is possible to change the direction of rotation of the hydraulic motor 12D. Furthermore, the spool 32Da moves to a position corresponding to the difference between two pilot pressures, and the degree of opening of the directional control valve 32D is thereby adjusted to reach a degree of opening corresponding to said position.

Note that the following elements are connected between the directional control valve 32D and the hydraulic motor 12D. Specifically, the directional control valve 32D is connected to the hydraulic motor 12 via two turning supply passages 37DL, 37DR, and relief valves 38DL, 38DR are connected to the two turning supply passages 37DL, 37DR, respectively. When the hydraulic pressure of the operating fluid flowing through the turning supply passages 37DL, 37DR connected to the two relief valves 38DL, 38DR exceeds a predetermined relief pressure, the two relief valves 38DL, 38DR discharge the operating fluid to the tank 27. Furthermore, the two turning supply passages 37DL, 37DR are connected to the tank 27 via check valves 39DL, 39DR and are designed to be able to add the operating fluid from the tank 27 when there is a shortage of the operating fluid.

The hydraulic drive system 1D configured as described above further includes a control unit 50D, and the operation of the regulator 23D and the directional control valves 32D is controlled by the control unit 50D. Furthermore, an operation device 51D is electrically connected to the control unit 50D in order to provide a command related to the operation of the hydraulic supply device 24D. The operation device 51D includes, for example, an electric joystick or a remote control valve. Specifically, the operation device 51D includes an operation lever 51Da; when the operation lever 51Da is pulled down, the operation device 51D outputs, to the control unit 50D, a signal corresponding to the extent of how much the operation lever 51Da is pulled down.

The control unit 50D is designed to control the operation of the directional control valve 32D in accordance with the signal output from the operation device 51D; the control unit 50D is configured as follows in order to control the operation of the directional control valve 32D. Specifically, the control unit 50D is electrically connected to the electromagnetic proportional control valves 32Db, 32Dc provided on the directional control valve 32D and outputs command signals to the electromagnetic proportional control valves 32Db, 32Dc in accordance with the signal output from the operation device 51D. Thus, the electromagnetic proportional control valves 32Db, 32Dc output pilot pressures corresponding to the command signals, and the spool 32Da moves to a position corresponding to the difference between the two pilot pressures. Accordingly, the directional control valve 32 opens with a degree of opening corresponding to the amount of operation on the operation lever 51Da, and the operating fluid is guided to the hydraulic motor 12D at a flow rate corresponding to the amount of the operation on the operation lever 51Da.

Furthermore, the hydraulic drive system 1D includes a rotation sensor 60D and a pressure sensor 62D. The rotation sensor 60D is provided on an output shaft 12*a* of the hydraulic motor 12D and is electrically connected to the control unit 50D. Furthermore, the rotation sensor 60D outputs, to the control unit 50D, a signal corresponding to the speed of rotation of the output shaft 12*a*, and the control unit 50D detects the speed of rotation of the hydraulic motor 12D on the basis of a signal from the rotation sensor 60D. Moreover, the pressure sensor 62D is connected to the hydraulic pump 21D and is electrically connected to the control unit 50D. The pressure sensor 62D disposed as just described outputs, to the control unit 50D, a signal corresponding to the dispense pressure of the hydraulic pump 21D, and the control unit 50D detects the dispense pressure of the hydraulic pump 21D on the basis of the signal output from the pressure sensor 62D. In addition, the control unit 50D performs various calculations and stores a variety of information.

In the hydraulic drive system 1D configured as described above, the control unit 50D controls the operation of the hydraulic supply device 24D in accordance with the operation performed on the operation device 51D and operates a hydraulic actuator 12D. Specifically, when the operation lever 51Da is operated and a signal is output from the operation device 51D, the control unit 50D outputs, to the electromagnetic proportional control valve 32Db (or the electromagnetic proportional control valve 32Dc), a rotation command signal corresponding to said signal, and operates the directional control valve 32D. Accordingly, the operating fluid is supplied from the hydraulic pump 21D to the hydraulic motor 12D, and the hydraulic motor 12D rotates with the operating fluid supplied thereto. Furthermore, the control unit 50D causes the directional control valve 32D to open with a degree of opening corresponding to the amount of the operation on the operation lever 51Da, and controls the dispense flow rate of the hydraulic pump 21D via the regulator 23D in accordance with the amount of the operation on the operation lever 51Da. Thus, it is possible to rotate the hydraulic motor 12D at a speed of rotation corresponding to the amount of the operation on the operation lever 51Da.

Figure 11:
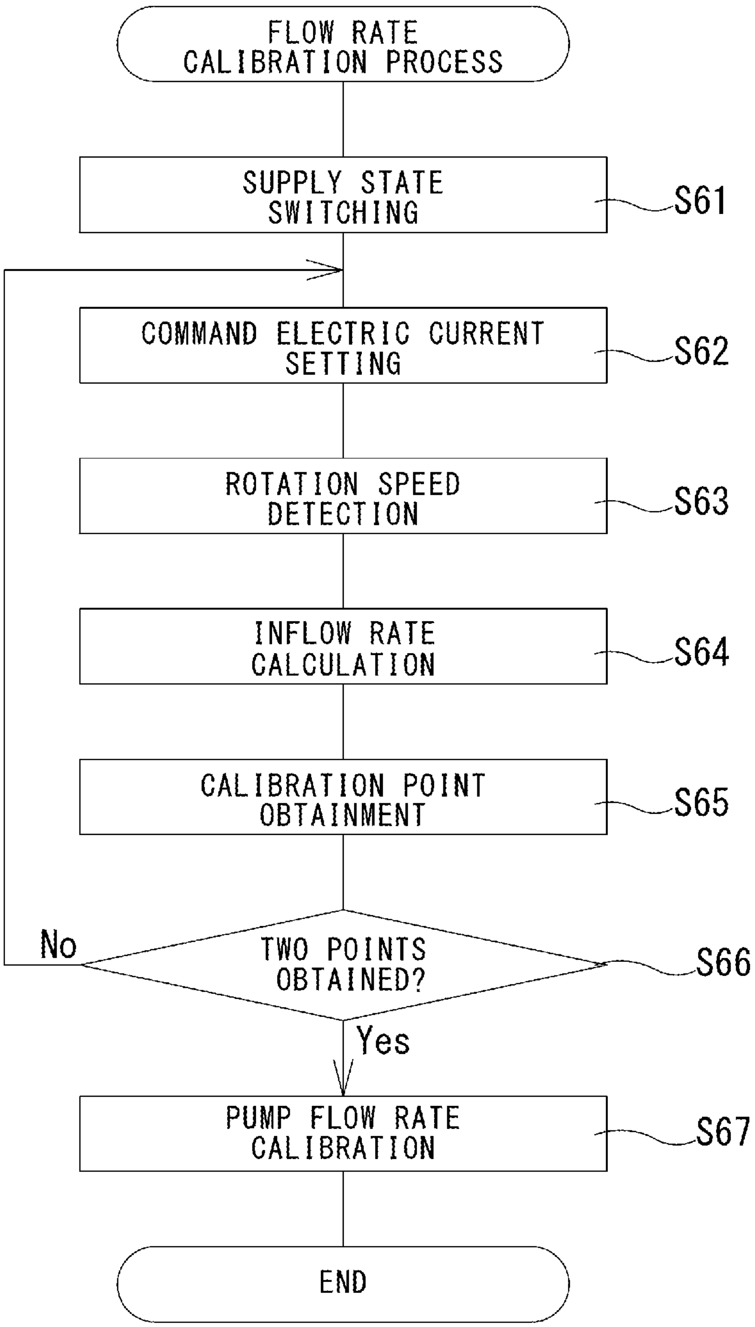
FIG. 11 is a flowchart illustrating the flow of steps in a flow-rate calibration process which is performed by the hydraulic drive system illustrated in FIG. 10.

The control unit 50D having such functions sets reference characteristics for the hydraulic pump 21D in advance and calibrates the set flow rate characteristics, as with the control units 50, 50A, 50B according to Embodiments 1 to 3. Hereinafter, the hydraulic-pump flow-rate calibration process which is performed by the control unit 50D will be described. Specifically, the control unit 50D determines whether or not a predetermined calibration condition is met, and when the calibration condition is met, performs a flow rate calibration process such as that illustrated in FIG. 11. When the flow rate calibration process is performed, the processing transitions to Step S61.

In Step S61, which is a supply state switching step, the state of the hydraulic drive system 1D is switched to a supply state in which the operating fluid dispensed from the hydraulic pump 21D is supplied to the hydraulic motor 12D. Specifically, the control unit 50D outputs a signal to the electromagnetic proportional control valve 32Db (or the electromagnetic proportional control valve 32Dc) of the directional control valve 32D, operates the spool 32Da of the directional control valve 32D, and connects the hydraulic pump 21D and the tank 27 to the hydraulic motor 12D. At this time, in order that the entire amount of the operating fluid in the hydraulic pump 21D shall be supplied to the hydraulic motor 12D, the spool 32Da is slid so that the degree of opening of the directional control valve 32D reaches the maximum degree. When the spool 32Da is slid in this manner and the state of the hydraulic supply device 24D is switched to the supply state, the processing transitions to Step S62.

In Step S62, which is the command electric current setting step, the predetermined flow rate command signal I1 which is set on the basis of the reference characteristics is output to the regulator 23D, as in Step S2 described above. Accordingly, the swash plate 22D of the hydraulic pump 21D rotates through a tilt angle corresponding to the flow rate command signal I1, and the operating fluid is dispensed from the hydraulic pump 21D at a flow rate corresponding to the flow rate command signal I1. Subsequently, when the entire amount of the operating fluid is supplied to the hydraulic motor 12D via the directional control valve 32D, the processing transitions to Step S63. In Step S63, which is a rotation speed detection step, the speed of rotation of the hydraulic motor 12D is detected. Specifically, the control unit 50D detects the speed of rotation of the hydraulic motor 12D on the basis of the signal output from the rotation sensor 60D. Subsequently, when the speed of rotation of the hydraulic motor 12D is detected, the processing transitions to Step S64.

In Step S64, which is a supply flow rate calculation step, the flow rate of the operating fluid supplied to the hydraulic motor 12D during rotation of the hydraulic motor 12D, namely, a supply flow rate, is calculated. Specifically, the control unit 50D stores the swept volume of the hydraulic motor 12D in advance and calculates the supply flow rate on the basis of said swept volume and the speed of rotation detected in Step S63. More specifically, the supply flow rate is calculated by multiplying the speed of rotation detected in Step S63 by the swept volume. When the supply flow rate is calculated, the processing transitions to Step S65.

In Step S65, which is a calibration point obtainment step, the actual dispense flow rate of the hydraulic pump 21D is calculated, and a calibration point for the hydraulic pump 21 is obtained on the basis of the calculated actual dispense flow rate. Specifically, the control unit 50D calculates the dispense flow rate of the hydraulic pump 21D on the basis of the supply flow rate calculated in Step S64, but, first, for this purpose, detects the dispense pressure of the hydraulic pump 21D on the basis of the signal from the pressure sensor 62D. Subsequently, the control unit 50D calculates the motor leakage amount of the hydraulic motor 12D on the basis of the detected dispense pressure and adds the calculated motor leakage amount to the turning flow rate. Thus, the dispense flow rate (=the turning flow rate+the motor leakage amount) of the hydraulic motor 12D is calculated. When the control unit 50D calculates the dispense flow rate, the control unit 50D stores the calculated dispense flow rate in association with the flow rate command signal I1 set in Step S62. For example, in the case where the dispense flow rate applied in response to the flow rate command signal I1 is high compared to the reference characteristics (the solid line in FIG. 3), the calibration point 71 is obtained, as illustrated in FIG. 3. When the first calibration point, namely, the calibration point 71, is calculated in this manner, the processing transitions to Step S66.

In Step S66, which is the number-of-calibration-points checking step, whether or not two or more calibration points have been obtained is determined at the time of calibrating the reference characteristics. Note that the number of calibration points to be obtained may be three or more. When the number of calibration points obtained is determined as one, the processing returns to Step S62, the flow rate command signal I2 is output to the regulator 23D, then the speed of turning is detected (Step S63), and furthermore, the turning flow rate is calculated on the basis of the speed of turning detected in Step 63 (Step S64). Furthermore, the control unit 50D calculates the dispense flow rate on the basis of the turning flow rate detected in Step S64 and stores the calculated flow rate and the flow rate command signal I2 in association with each other (Step S65). When the second calibration point, namely, the calibration point 74, is obtained in this manner (refer to FIG. 3), the processing transitions to Step S67.

In Step S67, which is a pump flow rate calibration step, the reference characteristics are calibrated on the basis of the two calibration points 71, 72 obtained in Step S65, as in Step S14 according to Embodiment 1. Specifically, in the range where the flow rate Q satisfies the relationship: $Qmin \leq Q \leq Qmax$, a straight line passing through the two calibration points 71, 72 (refer to the double-dot-dashed line in FIG. 3) is calculated as the actual measurement characteristics, which are actual flow rate characteristics of the hydraulic pump 21D. More specifically, the control unit 50D calculates, on the basis of the two calibration points 71, 72, a slope and an intercept of the actual measurement characteristics in the range $Qmin \leq Q \leq Qmax$, calculates the actual measurement characteristics, and sets the calculated actual measurement characteristics as new reference characteristics. When the reference characteristics are calibrated on the basis of the actual measurement characteristics in this manner, the flow rate calibration process ends.

Thus, in the hydraulic drive system 1D, by performing the flow rate calibration process such as that described above, it is possible to calibrate the dispense flow rate of the hydraulic pump 21D in the state where the hydraulic drive system 1D includes the hydraulic pump 21D. This means that in the hydraulic drive system 1D, the dispense flow rate of the hydraulic pump 21D can be controlled with high accuracy. Furthermore, the hydraulic drive system 1D can calculate the dispense flow rate of the hydraulic pump 21D on the basis of the speed of rotation of the hydraulic motor detected by the rotation sensor 60D and calibrate the flow rate characteristics on the basis of the calculated dispense flow rate. This means that in the hydraulic drive system 1D, the flow rate characteristics of the hydraulic pump 21D can be calibrated without addition of a flow rate sensor, and it is possible to minimize an increase in the number of components for the purpose of calibration.

Other Embodiments

The above description focuses on the case where the hydraulic drive systems 1, 1A, 1B according to Embodiments 1 to 3 are mounted on the excavator 3, but the excavator 3 is not necessarily the only option and may be replaced by other construction equipment such as a crane and a wheel loader. Furthermore, the construction equipment is not necessarily the only option; the hydraulic drive system may be applied to a robot of the hydraulic drive type, and in this case, water such as saline may be used as the operating fluid.

Note that in the case of a crane, the hydraulic-pump flow-rate calibration process may be performed using a hoist motor provided on a hoist device for the crane instead of a turning motor. In the case of a wheel loader or the like, the hydraulic-pump flow-rate calibration process may be performed using a traveling motor instead of the turning motor. Furthermore, the hydraulic-pump flow-rate calibration process may be performed using a cylinder instead of the hydraulic motor. Specifically, it is sufficient that a supply flow rate for the hydraulic actuator be calculated according to the amount of stroke of the cylinder and the hydraulic-pump flow-rate calibration process be performed on the basis of the calculated supply flow rate. At this time, a stroke sensor functions as the flow rate detection device. Furthermore, the flow rate detection device does not necessarily need to be the gyroscope sensor 60 or the stroke sensor and may be a flowmeter or the like provided in a passage connected to each hydraulic actuator. Moreover, in the hydraulic drive systems 1, 1A, 1B according to Embodiments 1 to 3, the three-axis gyroscope sensor is used as the gyroscope sensor 60, but a two-axis gyroscope sensor may be used.

Furthermore, in the hydraulic drive systems 1, 1A to 1C according to Embodiments 1 to 4, the traveling directional control valves 31L, 31R are configured to operate on the basis of the pilot pressures output from the electromagnetic proportional control valves 31Lb, 31Lc, 31Rb, 31Rc, but do not necessarily need to have such a configuration. Specifically, the traveling operation device 52 may include a remote control valve of the hydraulic type, and the traveling directional control valves 31L, 31R may be directional control valves of the hydraulic drive type that are driven with a pilot pressure output from the remote control valve. In this case, the pressure sensor or the like detects the pilot pressure output from the remote control valve, and thus whether or not the traveling operation device 52 has been operated is detected.

Furthermore, in the hydraulic drive systems 1, 1A to 1D according to Embodiments 1 to 5, the reference characteristics are calibrated on the basis of two or more calibration points, but the number of calibration points do not necessarily need to be two or more. Specifically, a changing point 75 of the minimum flow rate Qmin for each of the hydraulic pumps 21L, 21R, 21D varies to a greater extent among products than a changing point 76 of the maximum flow rate Qmax for the hydraulic pump and can be regarded as a substantially fixed point. Therefore, the actual measurement characteristics can be calculated on the basis of the changing point 75 and one calculated calibration point, and the reference characteristics can be calibrated on the basis of the calculated actual measurement characteristics. Furthermore, in the case where there is hysteresis in the reference characteristics of the hydraulic pumps 21L, 21R, 21D, two calibration points may be calculated at the times when the flow rate increases and when the flow rate decreases, and the reference characteristics may be calibrated for each of the cases where the flow rate increases and where the flow rate decreases. Moreover, the flow rates included in the reference characteristics for when the tilt angle is minimum and when the tilt angle is maximum, in other words, the minimum flow rate Qmin and the maximum flow rate Qmax of the hydraulic pumps 21L, 21R, 21D, may be calibrated in the aforementioned method.

Figure 12:
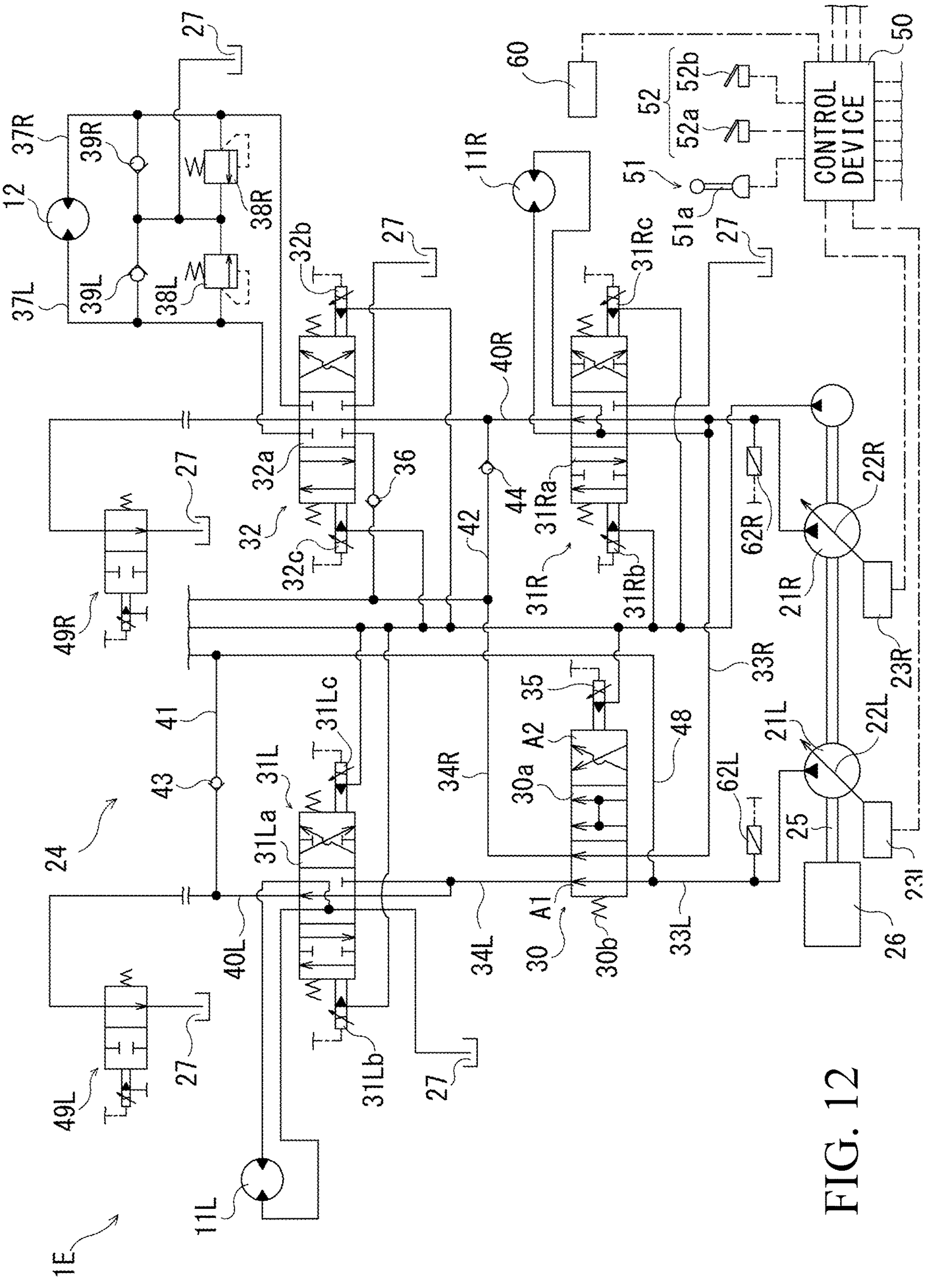
FIG. 12 is a hydraulic circuit representing a hydraulic drive system according to another embodiment.

Furthermore, the hydraulic drive systems 1, 1A, 1B according to Embodiments 1 to 3 include the unloader valves 45L, 45R, but the unloader valves 45L, 45R do not necessarily need to be included; a hydraulic drive system 1E illustrated in FIG. 12 is applicable. Specifically, a bypass cut-off valve 49L is provided in the left bypass passage 40L in the hydraulic drive system 1E, and the left bypass passage 40L is connected to the tank 27 via the bypass cut-off valve 49L. Furthermore, a directional control valve (for example, a bucket directional control valve and a first boom directional control valve) not illustrated in the drawings is provided in the left bypass passage 40L, on the upstream side of the bypass cut-off valve 49L, but on the downstream side of the left traveling directional control valve 31L, and the degree of opening of the left bypass passage 40L is adjusted according to the position of the spool of each directional control valve including the directional control valve 31L. Meanwhile, a bypass cut-off valve 49R is likewise provided in the right bypass passage 40R, and the right bypass passage 40R is connected to the tank 27 via the bypass cut-off valve 49R. Furthermore, the turning directional control valve 32 and a directional control valve (for example, an arm directional control valve and a second boom directional control valve) not illustrated in the drawings are provided in the right bypass passage 40R, on the upstream side of the bypass cut-off valve 49R, but on the downstream side of the right traveling directional control valve 31R, and the degree of opening of the right bypass passage 40R is adjusted according to the position of the spool of each directional control valve including the directional control valve 32.

In the hydraulic drive system configured as described above, the hydraulic-pump flow-rate calibration process is performed using the bypass cut-off valves 49L, 49R as the exhaust valves. Specifically, in Step S1, the bypass cut-off valve 49L is opened to connect the left supply passage 34L to the tank 27 via the left bypass passage 40L, and the entire amount of the operating fluid dispensed from the left hydraulic pump 21L returns to the tank 27. On the other hand, the right bypass passage 40R is closed by the spool 32*a* of the turning directional control valve 32 regardless of whether the bypass cut-off valve 49R is open or closed. Furthermore, in Step S7, the bypass cut-off valve 49L is closed to keep the operating fluid from flowing back from the left supply passage 34L to the tank 27. Thus, by using the bypass cut-off valve 49L located in the bypass passage 40L, it is possible to achieve the hydraulic-pump flow-rate calibration process without the unloader valves 45L, 45R. Note that even in the case where the unloader valves 45L, 45R are provided, it is possible to perform the hydraulic-pump flow-rate calibration process by substantially the same method without operating the unloader valves 45L, 45R.

Furthermore, in the hydraulic drive system 1A according to Embodiment 2, the minimum flow rate Qmin is used as the correction flow rate, but this does not necessarily need to be the case; it is sufficient that the flow rate to be used be a known flow rate. Moreover, the outflow rate does not necessarily need to be calculated using Expression 1 mentioned above; the flow rate sensor may be connected to the replenishing passage 47*a* to directly detect the outflow rate.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST

1, 1A-1E hydraulic drive system (hydraulic-pump flow-rate calibration system)
11L left traveling hydraulic motor
12 turning hydraulic motor
13 boom cylinder
14 arm cylinder
15 bucket cylinder
21L left hydraulic pump
21R right hydraulic pump
23D, 23L, 23R regulator
27 tank
30 straight travel valve (switch valve)
32 turning directional control valve (exhaust valve)
33R right pump passage
34R right supply passage
40R right bypass passage
44 check valve (bypass check valve)
45R right unloader valve (exhaust valve)
47 replenishing unit
47*b* throttle
50, 50A, 50B, 50C, 50D control unit (control device, calibration device)
60 gyroscope sensor
60D rotation sensor
62D pressure sensor
62R right pressure sensor
62L left pressure sensor

The invention claimed is:

1. A hydraulic-pump flow-rate calibration system, comprising:

a hydraulic pump of a variable capacitance type that is connected to a hydraulic actuator and supplies an operating fluid to the hydraulic actuator, the hydraulic actuator operating at a speed corresponding to a flow rate of the operating fluid supplied to the hydraulic actuator;

a regulator that changes a dispense flow rate of the hydraulic pump according to a flow rate command signal input to the regulator;

a flow rate detection device that detects a flow rate of the operating fluid to be supplied to the hydraulic actuator;

a control device that outputs, to the regulator, the flow rate command signal calculated based on a reference characteristic, to control the regulator; and a calibration device that calculates an actual measurement characteristic indicating the dispense flow rate for the flow rate command signal, and performs, on the reference characteristic, calibration based on the actual measurement characteristic, wherein the actual measurement characteristic is calculated based on the flow rate detected, as a result of the flow rate of the operating fluid to be supplied to the hydraulic actuator being detected by the flow rate detection device during output of a predetermined flow rate command signal from the control device to the regulator, and the control device outputs, to the regulator, the flow rate command signal calculated based on the reference characteristic calibrated based on the actual measurement characteristic, to control the dispense flow rate of the hydraulic pump.

2. The hydraulic-pump flow-rate calibration system according to claim 1, wherein:

the hydraulic actuator is a hydraulic motor; and the flow rate detection device includes a rotation sensor that detects a value corresponding to a rotational speed of an output shaft of the hydraulic motor and detects, on the basis of a result of the detection of the rotation sensor and a displacement of the hydraulic motor, the flow rate of the operating fluid to be supplied to the hydraulic motor.

3. The hydraulic-pump flow-rate calibration system according to claim 2, wherein:

the hydraulic motor causes a turning body rotatably provided on a structure to turn;

the rotation sensor detects a speed of turning of the turning body as the value corresponding to the rotational speed of the output shaft of the hydraulic motor; and the flow rate detection device detects, on the basis of the speed of turning detected and the displacement of the hydraulic motor, the flow rate of the operating fluid to be supplied to the hydraulic motor.

4. The hydraulic-pump flow-rate calibration system according to claim 3, further comprising:

a control unit that includes the calibration device and is provided on the turning body, wherein:

the rotation sensor is a gyroscope sensor and is embedded in the control unit.

5. A hydraulic-pump flow-rate calibration system, comprising:

a first hydraulic pump of a variable capacitance type that is connected to a hydraulic actuator and supplies an operating fluid to the hydraulic actuator, the hydraulic actuator operating at a speed corresponding to a flow rate of the operating fluid supplied to the hydraulic actuator;

a second hydraulic pump that is connected to the hydraulic actuator and supplies the operating fluid to the hydraulic actuator;

a first regulator that changes a dispense flow rate of the first hydraulic pump according to a first flow rate command signal input to the first regulator;

a switch valve that is connected to the first hydraulic pump, the second hydraulic pump, and the hydraulic actuator and connects one of the first hydraulic pump and the second hydraulic pump to the hydraulic actuator;

a flow rate detection device that detects the flow rate of the operating fluid to be supplied to the hydraulic actuator;

a control device that outputs, to the first regulator, the first flow rate command signal calculated based on a first reference characteristic, to control the first regulator; and a calibration device that calculates a first actual measurement characteristic indicating the dispense flow rate of the first hydraulic pump for the first flow rate command signal, and performs, on the first reference characteristic, calibration based on the first actual measurement characteristic, wherein the first actual measurement characteristic is calculated based on the flow rate detected, as a result of the first hydraulic pump and the hydraulic actuator being connected by the switch valve and the flow rate of the operating fluid to be supplied to the hydraulic actuator being detected by the flow rate detection device during output of a predetermined first flow rate command signal from the control device to the first regulator, and the control device outputs, to the first regulator, the first flow rate command signal calculated based on the first reference characteristic calibrated based on the first actual measurement characteristic, to control the dispense flow rate of the first hydraulic pump.

6. The hydraulic-pump flow-rate calibration system according to claim 5, wherein:

the hydraulic actuator is a hydraulic motor; and the flow rate detection device includes a rotation sensor that detects a value corresponding to a rotational speed of an output shaft of the hydraulic motor and detects, on the basis of a result of the detection of the rotation sensor and a displacement of the hydraulic motor, the flow rate of the operating fluid to be supplied to the hydraulic motor.

7. The hydraulic-pump flow-rate calibration system according to claim 6, wherein:

the hydraulic motor causes a turning body rotatably provided on a structure to turn;

the rotation sensor detects a speed of turning of the turning body as the value corresponding to the rotational speed of the output shaft of the hydraulic motor; and the flow rate detection device detects, on the basis of the speed of turning detected and the displacement of the hydraulic motor, the flow rate of the operating fluid to be supplied to the hydraulic motor.

8. The hydraulic-pump flow-rate calibration system according to claim 7, further comprising:

a control unit that includes the calibration device and is provided on the turning body, wherein:

the rotation sensor is a gyroscope sensor and is embedded in the control unit.

9. The hydraulic-pump flow-rate calibration system according to claim 5, further comprising:

a second regulator that changes, according to a second flow rate command signal input to the second regulator, a dispense flow rate of the second hydraulic pump that is of the variable capacitance type, wherein:

the control device outputs the second flow rate command signal to the second regulator to control the second regulator;

the calibration device calculates a second actual measurement characteristic of the dispense flow rate of the second hydraulic pump for the second flow rate command signal, and performs, on a second reference characteristic, calibration based on the second actual measurement characteristic; and the second actual measurement characteristic is calculated as a result of the second hydraulic pump and the hydraulic actuator being connected by the switch valve and the flow rate of the operating fluid to be supplied to the hydraulic actuator being detected by the flow rate detection device during output of a predetermined second flow rate command signal to the second regulator.

10. The hydraulic-pump flow-rate calibration system according to claim 9, further comprising:

a replenishing unit connected to each of a supply passage formed between a first hydraulic actuator and the switch valve and a pump passage formed between the first hydraulic pump and the switch valve, the first hydraulic actuator being the hydraulic actuator;

an exhaust valve connected to the pump passage and configured to be openable and closable, the exhaust valve being opened to discharge, to a tank, the operating fluid flowing in the pump passage; and an outflow rate detection device that detects a flow rate of the operating fluid flowing through the replenishing unit, wherein:

the switch valve is further connected to a second hydraulic actuator different from the first hydraulic actuator, and when the first hydraulic pump is connected to the first hydraulic actuator, the switch valve connects the second hydraulic pump to the second hydraulic actuator, and when the second hydraulic pump is connected to the first hydraulic actuator, the switch valve connects the first hydraulic pump to the second hydraulic actuator;

when the second hydraulic pump is connected to the first hydraulic actuator by the switch valve, the replenishing unit allows a flow directed from the supply passage to the pump passage to replenish the second hydraulic actuator with the operating fluid dispensed from the second hydraulic pump and blocks an opposite flow of the operating fluid;

the first actual measurement characteristic is calculated as a result of the first hydraulic pump and the first hydraulic actuator being connected by the switch valve and the flow rate of the operating fluid to be supplied to the first hydraulic actuator when the exhaust valve is closed being detected by the flow rate detection device during the output of the predetermined first flow rate command signal from the control device to the first regulator; and the second actual measurement characteristic is calculated on the basis of the flow rate detected by the flow rate detection device and an outflow rate detected by the outflow rate detection device, as a result of the second hydraulic pump and the first hydraulic actuator being connected by the switch valve and the flow rate of the operating fluid to be supplied to the first hydraulic actuator when the exhaust valve is open being detected by the flow rate detection device during the output of the predetermined second flow rate command signal to the second regulator.

11. The hydraulic-pump flow-rate calibration system according to claim 10, wherein:

the replenishing unit includes a throttle; and the outflow rate detection device includes a first pressure sensor that detects an outlet pressure of the first hydraulic pump and a second pressure sensor that detects an outlet pressure of the second hydraulic pump, and calculates the outflow rate on the basis of a difference between pressures detected by the first pressure sensor and the second pressure sensor.

12. The hydraulic-pump flow-rate calibration system according to claim 5, further comprising:

a second regulator that changes, according to a second flow rate command signal input to the second regulator, a dispense flow rate of the second hydraulic pump that is of the variable capacitance type; and a bypass passage connecting a supply passage formed between a first hydraulic actuator and the switch valve and a pump passage formed between the first hydraulic pump and the switch valve, the bypass passage including a bypass check valve that blocks a flow directed from the supply passage to the pump passage, the first hydraulic actuator being the hydraulic actuator, wherein:

the switch valve is further connected to a second hydraulic actuator different from the first hydraulic actuator, and when the first hydraulic pump is connected to the first hydraulic actuator, the switch valve connects the second hydraulic pump to the second hydraulic actuator, and when the second hydraulic pump is connected to the first hydraulic actuator, the switch valve connects the first hydraulic pump to the second hydraulic actuator;

the control device outputs the second flow rate command signal to the second regulator to control the second regulator;

the calibration device calculates a second actual measurement characteristic of the dispense flow rate of the second hydraulic pump for the second flow rate command signal, and performs, on a second reference characteristic, calibration based on the second actual measurement characteristic;

the second actual measurement characteristic is calculated on the basis of a detection flow rate and a correction flow rate detected by the flow rate detection device, as a result of the first flow rate command signal serving as a reference being output to the first regulator, the second hydraulic pump being connected to the first hydraulic actuator by the switch valve, the operating fluid dispensed from the first hydraulic pump being supplied to the first hydraulic actuator via the bypass passage, the operating fluid dispensed from the second hydraulic pump being supplied to the first hydraulic actuator via the switch valve, and the flow rate of the operating fluid to be supplied to the first hydraulic actuator being detected by the flow rate detection device during output of a predetermined second flow rate command signal to the second regulator; and the correction flow rate is detected by the flow rate detection device when the first flow rate command signal serving as the reference is output from the control device to the first regulator and the first hydraulic pump is connected to the first hydraulic actuator by the switch valve.

13. The hydraulic-pump flow-rate calibration system according to claim 9, wherein:

the switch valve is capable of connecting both the first hydraulic pump and the second hydraulic pump to the hydraulic actuator;

the calibration device calculates the second actual measurement characteristic of the dispense flow rate of the second hydraulic pump for the second flow rate command signal, and performs, on a second reference characteristic, calibration based on the second actual measurement characteristic;

the second actual measurement characteristic is calculated on the basis of a detection flow rate and a correction flow rate detected by the flow rate detection device, as a result of the first flow rate command signal serving as a reference being output to the first regulator, both the first hydraulic pump and the second hydraulic pump being connected to the hydraulic actuator by the switch valve, and the flow rate of the operating fluid to be supplied to the hydraulic actuator being detected by the flow rate detection device during the output of the predetermined second flow rate command signal to the second regulator; and the correction flow rate is a flow rate of the operating fluid flowing through the hydraulic actuator when the first flow rate command signal serving as the reference is output from the control device to the first regulator and the first hydraulic pump is connected to the hydraulic actuator by the switch valve.

14. The hydraulic-pump flow-rate calibration system according to claim 1, wherein:

the calibration device corrects, on the basis of an amount of leakage at the hydraulic actuator, the flow rate detected by the flow rate detection device, and calculates the actual measurement characteristic on the basis of the flow rate corrected.

15. The hydraulic-pump flow-rate calibration system according to claim 1, wherein:

the actual measurement characteristic is calculated on the basis of a plurality of flow rates detected by the flow rate detection device when a plurality of flow rate command signals different from each other are output.

16. The hydraulic-pump flow-rate calibration system according to claim 1, wherein:

when a predetermined condition is met, the calibration device calculates the actual measurement characteristic.

* * * * *